(12) United States Patent
Leung

(10) Patent No.: US 8,077,679 B2
(45) Date of Patent: Dec. 13, 2011

(54) METHOD AND APPARATUS FOR PROVIDING PROTOCOL OPTIONS IN A WIRELESS COMMUNICATION SYSTEM

(75) Inventor: Nikolai K. N. Leung, Takoma Park, MD (US)

(73) Assignee: QUALCOMM Incorporated, San Diego, CA (US)

(*) Notice: Subject to any disclaimer, the term of this patent is extended or adjusted under 35 U.S.C. 154(b) by 1134 days.

(21) Appl. No.: 10/033,141

(22) Filed: Oct. 24, 2001

(65) Prior Publication Data

US 2002/0141365 A1 Oct. 3, 2002

Related U.S. Application Data

(63) Continuation-in-part of application No. 09/933,914, filed on Aug. 20, 2001.

(60) Provisional application No. 60/279,970, filed on Mar. 28, 2001.

(51) Int. Cl.
*H04B 7/216* (2006.01)
(52) U.S. Cl. .................. 370/335; 370/278; 370/537
(58) Field of Classification Search .................. 370/278, 370/335, 537
See application file for complete search history.

(56) References Cited

U.S. PATENT DOCUMENTS

| | | |
|---|---|---|
| 4,163,255 A | 7/1979 | Pires et al. |
| 4,323,921 A | 4/1982 | Guillou |
| 4,750,167 A | 6/1988 | Meyer et al. |
| 4,870,408 A | 9/1989 | Zdunek et al. |
| 4,881,263 A | 11/1989 | Herbison et al. |
| 4,901,307 A | 2/1990 | Gilhousen et al. |
| RE33,189 E | 3/1990 | Lee et al. |
| 4,924,513 A | 5/1990 | Herbison et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,117,457 A | 5/1992 | Comerford et al. |
| 5,136,586 A | 8/1992 | Greenblatt et al. |
| 5,150,412 A | 9/1992 | Maru |
| 5,159,447 A | 10/1992 | Haskell et al. |
| 5,164,988 A | 11/1992 | Matyas et al. |
| 5,235,631 A | 8/1993 | Grube et al. |
| 5,237,612 A | 8/1993 | Raith |
| 5,241,598 A | 8/1993 | Raith |
| 5,253,294 A | 10/1993 | Maurer |

(Continued)

FOREIGN PATENT DOCUMENTS

CN 1281561 1/2001

(Continued)

OTHER PUBLICATIONS

Handley, M. et al., "Request for Comments: 2327 SDP: Session Description Protocol", Apr. 1998, Network Working Group ISI/LBNL, pp. 1-42.*

(Continued)

*Primary Examiner* — Jason E Mattis
(74) *Attorney, Agent, or Firm* — Darren M. Simon

(57) ABSTRACT

Method and apparatus for providing broadcast overhead information interleaved with a broadcast session in a transmission on a broadcast channel of a wireless communication system. In one embodiment, the information is stored at the receiver to provide quick updating when a user changes to an alternate broadcast channel. In one embodiment, the content server provides an identifier SDP_ID to distinguish among sets of protocol options description sets.

51 Claims, 27 Drawing Sheets

U.S. PATENT DOCUMENTS

| | | | |
|---|---|---|---|
| 5,257,396 A * | 10/1993 | Auld et al. ............... 725/139 |
| 5,325,357 A | 6/1994 | Kimoto et al. |
| 5,351,087 A | 9/1994 | Christopher et al. |
| 5,353,332 A | 10/1994 | Raith et al. |
| 5,363,379 A | 11/1994 | Eckenrode et al. |
| 5,365,572 A | 11/1994 | Saegusa et al. |
| 5,369,784 A | 11/1994 | Nelson et al. |
| 5,371,794 A | 12/1994 | Diffie et al. |
| 5,404,563 A | 4/1995 | Green et al. |
| 5,410,602 A | 4/1995 | Finkelstein et al. |
| 5,412,655 A | 5/1995 | Yamada et al. |
| 5,421,006 A | 5/1995 | Jablon et al. |
| 5,448,568 A | 9/1995 | Delpuch et al. |
| 5,467,398 A | 11/1995 | Pierce et al. |
| 5,473,609 A | 12/1995 | Chaney |
| 5,473,642 A | 12/1995 | Osawa |
| 5,481,613 A | 1/1996 | Ford et al. |
| 5,485,577 A | 1/1996 | Eyer et al. |
| 5,504,773 A | 4/1996 | Padovani et al. |
| 5,513,245 A | 4/1996 | Mizikovsky et al. |
| 5,515,441 A | 5/1996 | Faucher et al. |
| 5,537,474 A | 7/1996 | Brown et al. |
| 5,565,909 A | 10/1996 | Thibadeau et al. |
| 5,592,470 A | 1/1997 | Rudrapatna et al. |
| 5,673,259 A | 9/1997 | Quick, Jr. |
| 5,686,963 A | 11/1997 | Uz et al. |
| 5,708,961 A | 1/1998 | Hylton et al. |
| 5,729,540 A | 3/1998 | Wegrzyn |
| 5,740,246 A | 4/1998 | Saito |
| 5,748,736 A | 5/1998 | Mittra |
| 5,751,707 A | 5/1998 | Voit et al. |
| 5,751,725 A | 5/1998 | Chen et al. |
| 5,758,068 A | 5/1998 | Brandt et al. |
| 5,758,291 A | 5/1998 | Grube et al. |
| 5,768,276 A | 6/1998 | Diachina et al. |
| 5,774,496 A | 6/1998 | Butler et al. |
| 5,778,059 A | 7/1998 | Loghmani et al. |
| 5,778,069 A | 7/1998 | Thomlinson et al. |
| 5,778,187 A | 7/1998 | Monteiro et al. |
| 5,787,347 A | 7/1998 | Yu et al. |
| 5,796,829 A | 8/1998 | Newby et al. |
| 5,835,730 A | 11/1998 | Grossman et al. |
| 5,850,444 A | 12/1998 | Rune et al. |
| 5,850,445 A | 12/1998 | Chan et al. |
| 5,870,474 A | 2/1999 | Wasilewski et al. |
| 5,878,141 A | 3/1999 | Daly et al. |
| 5,881,368 A | 3/1999 | Grob et al. |
| 5,884,196 A | 3/1999 | Lekven et al. |
| 5,887,252 A | 3/1999 | Noneman |
| 5,909,491 A | 6/1999 | Luo |
| 5,923,649 A | 7/1999 | Raith |
| 5,936,965 A | 8/1999 | Doshi et al. |
| 5,940,507 A | 8/1999 | Cane et al. |
| 5,946,316 A | 8/1999 | Chen et al. |
| 5,956,404 A | 9/1999 | Schneier et al. |
| 5,956,681 A | 9/1999 | Yamakita |
| 5,970,072 A | 10/1999 | Gammenthaler, Jr. et al. |
| 5,970,417 A | 10/1999 | Toyryla et al. |
| 5,978,386 A | 11/1999 | Hamalainen et al. |
| 5,983,099 A | 11/1999 | Yao et al. |
| 5,990,928 A | 11/1999 | Sklar et al. |
| 5,991,400 A | 11/1999 | Kamperman |
| 5,991,407 A | 11/1999 | Murto |
| 6,006,073 A | 12/1999 | Glauner et al. |
| 6,018,360 A | 1/2000 | Stewart et al. |
| 6,021,124 A | 2/2000 | Haartsen et al. |
| 6,026,165 A | 2/2000 | Marino et al. |
| 6,032,197 A | 2/2000 | Birdwell et al. ............... 709/247 |
| 6,044,154 A | 3/2000 | Kelly |
| 6,047,071 A | 4/2000 | Shah |
| 6,047,395 A | 4/2000 | Zook et al. |
| 6,052,812 A | 4/2000 | Chen et al. |
| 6,055,236 A | 4/2000 | Nessett et al. |
| 6,055,314 A | 4/2000 | Spies et al. |
| 6,058,289 A | 5/2000 | Gardner et al. |
| 6,065,061 A | 5/2000 | Blahut et al. |
| 6,067,290 A * | 5/2000 | Paulraj et al. ............... 370/329 |
| 6,073,122 A | 6/2000 | Wool |
| 6,081,907 A | 6/2000 | Witty et al. |
| 6,097,817 A | 8/2000 | Bilgic et al. |
| 6,098,878 A | 8/2000 | Dent et al. |
| 6,108,424 A | 8/2000 | Pitiot |
| 6,108,706 A | 8/2000 | Birdwell et al. |
| 6,111,866 A | 8/2000 | Kweon et al. |
| 6,128,389 A | 10/2000 | Chan et al. |
| 6,128,490 A | 10/2000 | Shaheen et al. |
| 6,148,010 A | 11/2000 | Sutton et al. |
| 6,157,719 A | 12/2000 | Wasilewski et al. |
| 6,172,972 B1 | 1/2001 | Birdwell et al. |
| 6,185,430 B1 | 2/2001 | Yee et al. |
| 6,195,546 B1 | 2/2001 | Leung et al. |
| 6,199,161 B1 | 3/2001 | Ahvenainen |
| 6,201,961 B1 | 3/2001 | Schindall et al. |
| 6,208,634 B1 | 3/2001 | Boulos et al. |
| 6,230,024 B1 | 5/2001 | Wang et al. |
| 6,233,234 B1 | 5/2001 | Curry et al. |
| 6,233,341 B1 | 5/2001 | Riggins |
| 6,240,091 B1 | 5/2001 | Ginzboorg et al. |
| 6,253,069 B1 | 6/2001 | Mankovitz et al. |
| 6,253,326 B1 | 6/2001 | Lincke et al. |
| 6,256,509 B1 | 7/2001 | Tanaka et al. |
| 6,266,420 B1 | 7/2001 | Langford et al. |
| 6,272,632 B1 | 8/2001 | Carman et al. |
| 6,295,361 B1 | 9/2001 | Kadansky et al. |
| 6,310,661 B1 * | 10/2001 | Arsenault ............... 348/725 |
| 6,314,095 B1 | 11/2001 | Loa |
| 6,343,280 B2 | 1/2002 | Clark |
| 6,345,307 B1 | 2/2002 | Booth |
| 6,353,614 B1 | 3/2002 | Borella et al. |
| 6,363,242 B1 | 3/2002 | Brown, Jr. et al. |
| 6,363,480 B1 | 3/2002 | Perlman et al. |
| 6,373,829 B1 | 4/2002 | Vilmur et al. |
| 6,374,103 B1 | 4/2002 | Kamel et al. |
| 6,377,810 B1 | 4/2002 | Geiger et al. |
| 6,385,200 B1 | 5/2002 | Erami et al. |
| 6,385,461 B1 | 5/2002 | Raith et al. |
| 6,415,312 B1 | 7/2002 | Boivie |
| 6,424,717 B1 | 7/2002 | Pinder et al. |
| 6,424,947 B1 | 7/2002 | Tsuria et al. |
| 6,438,612 B1 | 8/2002 | Ylonen et al. |
| 6,449,491 B1 | 9/2002 | Dailey et al. |
| 6,463,155 B1 | 10/2002 | Akiyama et al. |
| 6,473,419 B1 | 10/2002 | Gray et al. |
| 6,473,858 B1 | 10/2002 | Shimomura et al. |
| 6,477,377 B2 | 11/2002 | Backstrom et al. |
| 6,490,259 B1 | 12/2002 | Agrawal et al. |
| 6,502,140 B1 | 12/2002 | Boivie |
| 6,507,590 B1 | 1/2003 | Terho et al. |
| 6,510,515 B1 | 1/2003 | Raith |
| RE38,007 E | 2/2003 | Tsukamoto et al. |
| 6,519,266 B1 | 2/2003 | Manning et al. |
| 6,523,069 B1 | 2/2003 | Luczycki et al. |
| 6,529,740 B1 | 3/2003 | Ganucheau, Jr. et al. |
| 6,536,041 B1 | 3/2003 | Knudson et al. |
| 6,538,996 B1 | 3/2003 | West et al. |
| 6,539,242 B1 | 3/2003 | Bayley |
| 6,542,490 B1 | 4/2003 | Ahmadvand et al. |
| 6,549,771 B2 | 4/2003 | Chang et al. |
| 6,560,206 B1 | 5/2003 | Naden et al. |
| 6,564,211 B1 | 5/2003 | Andreev et al. |
| 6,567,914 B1 | 5/2003 | Just et al. |
| 6,571,109 B1 | 5/2003 | Kim |
| 6,574,211 B2 | 6/2003 | Padovani et al. |
| 6,577,734 B1 | 6/2003 | Etzel et al. |
| 6,577,848 B1 | 6/2003 | Gregg et al. |
| 6,580,756 B1 * | 6/2003 | Matsui et al. ............ 375/240.08 |
| 6,598,203 B1 | 7/2003 | Tang et al. |
| 6,600,745 B1 | 7/2003 | Chopping et al. |
| 6,601,068 B1 | 7/2003 | Park et al. |
| 6,603,857 B1 | 8/2003 | Batten-Carew et al. |
| 6,606,706 B1 | 8/2003 | Li et al. |
| 6,608,841 B1 | 8/2003 | Koodli |
| 6,614,804 B1 | 9/2003 | McFadden et al. |
| 6,633,979 B1 | 10/2003 | Smeets |
| 6,647,000 B1 | 11/2003 | Persson et al. |
| 6,654,384 B1 | 11/2003 | Reza et al. |
| 6,658,463 B1 | 12/2003 | Dillon et al. |

| | | | | | | |
|---|---|---|---|---|---|---|
| 6,665,718 B1 | 12/2003 | Chuah et al. | | 7,290,063 B2 | 10/2007 | Kalliokulju et al. |
| 6,680,920 B1 | 1/2004 | Wan et al. | | 7,301,968 B2 | 11/2007 | Haran et al. |
| 6,690,795 B1 | 2/2004 | Richards | | 7,352,568 B2 | 4/2008 | Hawkes et al. |
| 6,704,368 B1 | 3/2004 | Nefedov et al. | | 7,376,963 B2 | 5/2008 | Kato et al. |
| 6,704,369 B1 | 3/2004 | Kawasaki et al. | | 2001/0004761 A1 | 6/2001 | Zehavi et al. |
| 6,711,182 B1 | 3/2004 | Gibbs et al. | | 2001/0029581 A1 | 10/2001 | Knauft |
| 6,714,650 B1 | 3/2004 | Maillard et al. | | 2001/0036200 A1 | 11/2001 | Nelson et al. |
| 6,714,784 B1 | 3/2004 | Forssell et al. | | 2001/0036834 A1 | 11/2001 | Das et al. |
| 6,721,805 B1 | 4/2004 | Bhagwat et al. | | 2001/0055298 A1 | 12/2001 | Baker et al. |
| 6,725,459 B2 | 4/2004 | Bacon et al. | | 2002/0001386 A1 | 1/2002 | Akiyama |
| 6,728,226 B1 | 4/2004 | Naito | | 2002/0002541 A1 | 1/2002 | Williams |
| 6,731,936 B2 | 5/2004 | Chen et al. | | 2002/0010681 A1 | 1/2002 | Hillegass et al. |
| 6,735,177 B1 | 5/2004 | Suzuki et al. | | 2002/0014159 A1 | 2/2002 | Tatsumi et al. |
| 6,751,218 B1 | 6/2004 | Hagirahim et al. | | 2002/0021809 A1 | 2/2002 | Salo et al. |
| 6,760,602 B2 | 7/2004 | Tangorra et al. | | 2002/0023165 A1 | 2/2002 | Lahr |
| 6,760,752 B1 | 7/2004 | Liu et al. | | 2002/0071558 A1 | 6/2002 | Patel |
| 6,763,025 B2 | 7/2004 | Leatherbury et al. | | 2002/0076195 A1 | 6/2002 | Nakajima et al. |
| 6,765,909 B1 | 7/2004 | Sen et al. | | 2002/0080887 A1 | 6/2002 | Jeong et al. |
| 6,766,024 B1 | 7/2004 | Rix et al. | | 2002/0091860 A1 | 7/2002 | Kalliokulju et al. |
| 6,775,303 B1 * | 8/2004 | Rustad et al. ................. 370/523 | | 2002/0091931 A1 | 7/2002 | Quick, Jr. et al. |
| 6,781,999 B2 | 8/2004 | Eyuboglu et al. | | 2002/0097722 A1 | 7/2002 | Liao et al. |
| 6,788,681 B1 | 9/2004 | Hurren et al. | | 2002/0099949 A1 | 7/2002 | Fries et al. |
| 6,792,048 B1 | 9/2004 | Lee et al. | | 2002/0102964 A1 | 8/2002 | Park |
| 6,798,791 B1 | 9/2004 | Riazi et al. | | 2002/0112234 A1 | 8/2002 | Bacon |
| 6,801,508 B1 | 10/2004 | Lim et al. | | 2002/0141591 A1 | 10/2002 | Hawkes et al. |
| 6,804,520 B1 | 10/2004 | Johansson et al. | | 2002/0152384 A1 | 10/2002 | Shelest et al. |
| 6,819,930 B1 | 11/2004 | Laroia et al. | | 2002/0154781 A1 | 10/2002 | Sowa et al. |
| 6,826,406 B1 | 11/2004 | Vialen et al. | | 2002/0164025 A1 | 11/2002 | Raiz et al. |
| 6,831,910 B1 | 12/2004 | Moon et al. | | 2002/0169724 A1 | 11/2002 | Moroney et al. |
| 6,832,314 B1 | 12/2004 | Irvin | | 2002/0176408 A1 | 11/2002 | Kangas et al. |
| 6,862,684 B1 | 3/2005 | DiGiorgio | | 2002/0181423 A1 | 12/2002 | Chen et al. |
| 6,870,923 B2 | 3/2005 | Yi et al. | | 2003/0009669 A1 | 1/2003 | White et al. |
| 6,879,573 B1 | 4/2005 | Huo et al. | | 2003/0018891 A1 | 1/2003 | Hall et al. |
| 6,879,690 B2 | 4/2005 | Faccin et al. | | 2003/0030581 A1 | 2/2003 | Roy |
| 6,882,850 B2 | 4/2005 | McConnell et al. | | 2003/0031322 A1 | 2/2003 | Beckmann et al. |
| 6,882,860 B1 | 4/2005 | Kim | | 2003/0035389 A1 | 2/2003 | Chen et al. |
| 6,885,874 B2 | 4/2005 | Grube et al. | | 2003/0039237 A1 | 2/2003 | Forslow et al. |
| 6,895,216 B2 | 5/2005 | Sato et al. | | 2003/0039361 A1 | 2/2003 | Hawkes et al. |
| 6,898,285 B1 | 5/2005 | Hutchings et al. | | 2003/0054807 A1 | 3/2003 | Hsu et al. |
| 6,898,640 B1 | 5/2005 | Kurita | | 2003/0064679 A1 | 4/2003 | Kim et al. |
| 6,915,272 B1 | 7/2005 | Zilliacus et al. | | 2003/0070092 A1 | 4/2003 | Hawkes et al. |
| 6,918,035 B1 | 7/2005 | Patel et al. | | 2003/0072384 A1 | 4/2003 | Chen et al. |
| 6,920,119 B2 | 7/2005 | Rinchiuso | | 2003/0087653 A1 | 5/2003 | Leung et al. |
| 6,925,285 B1 | 8/2005 | Kim et al. | | 2003/0101401 A1 | 5/2003 | Salvi et al. |
| 6,944,763 B1 | 9/2005 | Asano et al. | | 2003/0123669 A1 | 7/2003 | Koukoulidis et al. |
| 6,956,833 B1 | 10/2005 | Yukie et al. | | 2003/0126440 A1 | 7/2003 | Go et al. |
| 6,959,384 B1 | 10/2005 | Serret-Avila | | 2003/0134655 A1 | 7/2003 | Chen et al. |
| 6,970,689 B2 | 11/2005 | Khorram | | 2003/0135748 A1 | 7/2003 | Yamada et al. |
| 6,978,143 B1 | 12/2005 | Vialen | | 2003/0159029 A1 | 8/2003 | Brown et al. |
| 6,983,410 B2 | 1/2006 | Chen et al. | | 2003/0217057 A1 | 11/2003 | Kuroiwa et al. |
| 6,987,982 B2 | 1/2006 | Willenegger et al. | | 2004/0005860 A1 | 1/2004 | Kato et al. |
| 6,990,680 B1 * | 1/2006 | Wugofski ....................... 725/58 | | 2004/0019787 A1 | 1/2004 | Shibata et al. |
| 7,016,351 B1 | 3/2006 | Farinacci et al. | | 2004/0022216 A1 | 2/2004 | Shi et al. |
| 7,036,023 B2 | 4/2006 | Fries et al. | | 2004/0095515 A1 | 5/2004 | Tajima et al. |
| 7,039,180 B1 | 5/2006 | Issaa et al. | | 2004/0101138 A1 | 5/2004 | Revital et al. |
| 7,046,672 B2 | 5/2006 | Liao et al. | | 2004/0107350 A1 | 6/2004 | Wasilewski et al. |
| 7,058,809 B2 | 6/2006 | White et al. | | 2004/0120527 A1 | 6/2004 | Hawkes et al. |
| 7,069,436 B1 | 6/2006 | Akachi | | 2004/0131185 A1 | 7/2004 | Kakumer et al. |
| 7,072,865 B2 | 7/2006 | Akiyama et al. | | 2004/0132402 A1 | 7/2004 | Agashe et al. |
| 7,079,502 B2 | 7/2006 | Yamano et al. | | 2004/0151317 A1 | 8/2004 | Hyypa et al. |
| 7,079,523 B2 | 7/2006 | Nelson, Jr. et al. | | 2004/0199474 A1 | 10/2004 | Ritter |
| 7,096,355 B1 | 8/2006 | Marvit et al. | | 2004/0202329 A1 | 10/2004 | Jung et al. |
| 7,114,175 B2 | 9/2006 | Lahteenmaki | | 2004/0243808 A1 | 12/2004 | Ishiguro et al. |
| 7,116,892 B2 | 10/2006 | Wajs | | 2004/0266391 A1 | 12/2004 | Hafren |
| 7,133,353 B2 | 11/2006 | Sourour et al. | | 2005/0008159 A1 | 1/2005 | Grilli et al. |
| 7,134,019 B2 | 11/2006 | Shelest et al. | | 2005/0048963 A1 | 3/2005 | Kubler et al. |
| 7,177,424 B1 | 2/2007 | Furuya et al. | | 2005/0055551 A1 | 3/2005 | Becker et al. |
| 7,181,620 B1 | 2/2007 | Hur | | 2005/0063544 A1 | 3/2005 | Uusitalo et al. |
| 7,185,362 B2 | 2/2007 | Hawkes et al. | | 2005/0108563 A1 | 5/2005 | Becker et al. |
| 7,197,072 B1 | 3/2007 | Hsu et al. | | 2005/0144550 A1 | 6/2005 | Jeon et al. |
| 7,200,230 B2 | 4/2007 | Knauft | | 2005/0165711 A1 | 7/2005 | Hamatsu |
| 7,203,314 B1 | 4/2007 | Kahn et al. | | 2005/0216731 A1 | 9/2005 | Saito et al. |
| 7,209,459 B2 | 4/2007 | Kangas | | 2005/0238315 A1 | 10/2005 | Kataoka |
| 7,215,775 B2 | 5/2007 | Noguchi et al. | | 2005/0271210 A1 | 12/2005 | Soppera |
| 7,237,108 B2 | 6/2007 | Medvinsky et al. | | 2006/0078000 A1 | 4/2006 | Rinne et al. |
| 7,239,704 B1 | 7/2007 | Maillard et al. | | 2006/0168446 A1 | 7/2006 | Ahonen et al. |
| 7,266,687 B2 | 9/2007 | Sowa et al. | | 2006/0171540 A1 | 8/2006 | Lee et al. |
| 7,278,164 B2 | 10/2007 | Raiz et al. | | 2006/0242412 A1 | 10/2006 | Jung et al. |
| 7,280,660 B2 | 10/2007 | Salo et al. | | 2007/0038610 A1 | 2/2007 | Omoigui |

| | | | |
|---|---|---|---|
| 2007/0116282 A1 | 5/2007 | Hawkes et al. | |
| 2007/0214482 A1 | 9/2007 | Nguyen | |
| 2007/0280169 A1 | 12/2007 | Cam Winget | |

FOREIGN PATENT DOCUMENTS

| | | |
|---|---|---|
| EP | 0636963 | 1/1995 |
| EP | 0702477 A2 | 3/1996 |
| EP | 0748058 A2 | 12/1996 |
| EP | 0813309 A2 | 12/1997 |
| EP | 0854618 A2 | 7/1998 |
| EP | 0924898 A1 | 6/1999 |
| EP | 0928084 A2 | 7/1999 |
| EP | 0951198 A2 | 10/1999 |
| EP | 0993128 A1 | 4/2000 |
| EP | 0999656 A1 | 5/2000 |
| EP | 1001570 A2 | 5/2000 |
| EP | 1075123 | 7/2000 |
| EP | 1024661 | 8/2000 |
| EP | 1032150 A2 | 8/2000 |
| EP | 1071296 | 1/2001 |
| EP | 1075118 | 2/2001 |
| EP | 1098446 A2 | 5/2001 |
| EP | 1117204 | 7/2001 |
| EP | 1134951 A2 | 9/2001 |
| EP | 1143635 A1 | 10/2001 |
| EP | 1185125 A1 | 3/2002 |
| EP | 1190526 A1 | 3/2002 |
| EP | 1213943 | 6/2002 |
| EP | 1248188 | 10/2002 |
| EP | 2204940 | 7/2010 |
| GB | 2346512 A | 8/2000 |
| JP | 1101042 | 4/1989 |
| JP | 02090840 | 3/1990 |
| JP | 03179841 | 5/1991 |
| JP | 5216411 A | 8/1993 |
| JP | 06125554 | 5/1994 |
| JP | 7115414 | 5/1995 |
| JP | 7193569 | 7/1995 |
| JP | 7288798 | 10/1995 |
| JP | 09-135478 | 5/1997 |
| JP | 10023529 A | 1/1998 |
| JP | 10051380 A | 2/1998 |
| JP | 10063598 A | 3/1998 |
| JP | 10-093547 | 4/1998 |
| JP | 10093547 | 4/1998 |
| JP | 10191459 | 7/1998 |
| JP | 10200536 A | 7/1998 |
| JP | 10214233 | 8/1998 |
| JP | 10240826 | 11/1998 |
| JP | 10512428 | 11/1998 |
| JP | 11127468 | 5/1999 |
| JP | 11161167 | 6/1999 |
| JP | 11-243569 | 9/1999 |
| JP | 11510668 T | 9/1999 |
| JP | 11-331070 | 11/1999 |
| JP | 11-331150 | 11/1999 |
| JP | 11313059 A | 11/1999 |
| JP | 11513853 | 11/1999 |
| JP | 11-355858 | 12/1999 |
| JP | 11355460 A | 12/1999 |
| JP | 2000-078555 | 3/2000 |
| JP | 2000115860 | 4/2000 |
| JP | 2000134193 | 5/2000 |
| JP | 2000137551 A | 5/2000 |
| JP | 2000165258 A | 6/2000 |
| JP | 2000-196673 | 7/2000 |
| JP | 2000-253459 | 9/2000 |
| JP | 2000244603 | 9/2000 |
| JP | 2000261374 A | 9/2000 |
| JP | 2000269959 | 9/2000 |
| JP | 2000511733 T | 9/2000 |
| JP | 2000287192 | 10/2000 |
| JP | 2000295541 | 10/2000 |
| JP | 2000513519 | 10/2000 |
| JP | 2000324155 A | 11/2000 |
| JP | 2001007800 | 1/2001 |
| JP | 2001016253 A | 1/2001 |
| JP | 2001500327 | 1/2001 |
| JP | 2001-053675 | 2/2001 |
| JP | 200136941 | 2/2001 |
| JP | 2001036466 A | 2/2001 |
| JP | 2001045100 A | 2/2001 |
| JP | 2001-077859 | 3/2001 |
| JP | 2001119340 A | 4/2001 |
| JP | 2001134193 | 5/2001 |
| JP | 2001136507 A | 5/2001 |
| JP | 2001-177513 | 6/2001 |
| JP | 2001177523 A | 6/2001 |
| JP | 2001177564 A | 6/2001 |
| JP | 2001512842 | 8/2001 |
| JP | 2001513587 | 9/2001 |
| JP | 2001522164 T | 11/2001 |
| JP | 2002026835 | 1/2002 |
| JP | 2002027417 | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 | 5/2002 |
| JP | 2002175505 | 6/2002 |
| JP | 2002521879 T | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002300152 | 10/2002 |
| JP | 2002319936 | 10/2002 |
| JP | 2002541685 | 12/2002 |
| JP | 2003503896 | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004532554 | 10/2004 |
| JP | 2004533174 | 10/2004 |
| JP | 2004343764 | 12/2004 |
| JP | 2005509367 | 4/2005 |
| JP | 2005512471 | 4/2005 |
| KR | 20000062153 | 10/2000 |
| KR | 200130725 | 4/2001 |
| KR | 20010030696 | 4/2001 |
| RU | 2073913 | 2/1997 |
| RU | 2073913 C1 | 2/1997 |
| RU | 2077113 | 4/1997 |
| RU | 2091983 | 9/1997 |
| RU | 2115249 | 7/1998 |
| RU | 2147792 | 4/2000 |
| RU | 2187205 C2 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | 86007224 | 12/1986 |
| WO | 9611538 | 4/1996 |
| WO | 9715161 | 4/1997 |
| WO | 9717790 | 5/1997 |
| WO | WO9716890 A2 | 5/1997 |
| WO | 9748212 | 12/1997 |
| WO | WO9810604 A1 | 3/1998 |
| WO | WO9825422 A1 | 6/1998 |
| WO | WO9857509 A2 | 12/1998 |
| WO | WO9922478 A1 | 5/1999 |
| WO | WO09022466 A1 | 5/1999 |
| WO | 9930234 | 6/1999 |
| WO | WO9944114 A1 | 9/1999 |
| WO | WO9959355 A2 | 11/1999 |
| WO | 9962231 | 12/1999 |

| | | |
|---|---|---|
| WO | WO9966657 A1 | 12/1999 |
| WO | 0002406 | 1/2000 |
| WO | WO0004718 A1 | 1/2000 |
| WO | WO0008883 A1 | 2/2000 |
| WO | WO0013356 A1 | 3/2000 |
| WO | 0033535 | 6/2000 |
| WO | 0036804 | 6/2000 |
| WO | 0051308 | 8/2000 |
| WO | WO0048358 | 8/2000 |
| WO | 0052880 | 9/2000 |
| WO | 0056018 | 9/2000 |
| WO | WO0057601 A1 | 9/2000 |
| WO | WO0062476 | 10/2000 |
| WO | WO0062547 A1 | 10/2000 |
| WO | WO0072609 | 11/2000 |
| WO | 0079734 | 12/2000 |
| WO | WO0074311 | 12/2000 |
| WO | WO0076125 A1 | 12/2000 |
| WO | WO0078008 A1 | 12/2000 |
| WO | 01001630 | 1/2001 |
| WO | 0110146 | 2/2001 |
| WO | WO0113358 | 2/2001 |
| WO | 0119027 | 3/2001 |
| WO | WO0117163 | 3/2001 |
| WO | WO0120805 | 3/2001 |
| WO | WO0145443 | 6/2001 |
| WO | WO0150783 | 7/2001 |
| WO | WO0156232 | 8/2001 |
| WO | WO0208449 | 1/2002 |
| WO | WO0247356 | 6/2002 |
| WO | WO0247407 A2 | 6/2002 |
| WO | 02061572 | 8/2002 |
| WO | 02080449 | 10/2002 |
| WO | WO02080454 A2 | 10/2002 |
| WO | WO02096150 | 11/2002 |
| WO | 02054663 | 1/2003 |
| WO | WO03001772 | 3/2003 |
| WO | 03032573 | 4/2003 |
| WO | WO03051072 | 6/2003 |
| WO | WO03063418 A1 | 7/2003 |
| WO | WO2004025895 A1 | 3/2004 |
| WO | WO2005008393 | 1/2005 |

OTHER PUBLICATIONS

M. Handley et al. *RFC2327—SDP: Session Description Protocol*, Netwrok Working Group, Request for Comments: 2327. Category: Standard Track. ISI/LBNL, Apr. 1998 (pp. 1-31).

Handley, et al. "SDP: Session Description protocol"RFC 2327, Apr. 1998, pp. 1-42.

"Universal Mobile Telecommunications System (UMTS); Radio Interface for Broadcast/Multicast Services (3GPP TR 25.925 version 3.3.0 Release 1999)" ETSI TR 125 925 V3.3.0, Dec. 1, 2000, pp. 1-35, XP002230388, p. 17-18; Figure 6.5.

Berkovits, S. "How to Broadcast a Secret" Advances in Cryptology, Eurocrypt, International Conference on the Theory and Application of Cryptographic Techniques, Springer-Verlag, Delaware, Apr. 11. 1991, pp. 535-541.

Bormann, C., et al. "Robust Header Compression (ROHC)" Internet Draft, Dec. 2000, pp. 1-122, XP002901751 (pp. 4-5).

Farinacci, D., et al., "Generic Routing Encapsulation (GRE)," Network Working Group Request for Comments 2784, Mar. 1-8, 2000. <URL:http://www.globecom.net/ieft/rfc/rfc2784.html> (retrieved on Feb. 14, 2003).

Jalali, A., et al. "Data Throughput of CDMA-HDR a High Efficiency-High Data Rate Personal Communication Wireless System," 2000 IEEE. pp. 1854-1858.

Jou, Y. "Developments in Third Generation (3G) CDMA Technology," 2000 IEEE, pp. 460-464.

Keeler, Robert E., "Interoperability Considerations for Digital HDTV," IEEE Transactions on Broadcasting, vol. 37, No. 4, Dec. 1991, pp. 128-130.

Linuxguruz. "Free On-Line Dictionary of Computing," § Internet Protocol, Dec. 2000.

Marchent. B.G., et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Menezes, A.J., et al. "Key Layering and Cryptoperiods, Passage," Handbook of Applied Cryptography, CRC Press Series on Discrete Mathematices and its Applications, Boca Raton, FL, CRC Press, US, 1997, pp. 551-553, 577-581.

Rose, Greg, et al., "The Secure Real Time Transport Protocol," Internet Draft, Feb. 2001, pp. 1-26.

Schneier, Bruce. Applied Cryptography, Second Edition, 1996 John Wiley & Sons, Inc., pp. 182-184.

Shannon, C.E., "A Mathematical Theory of Communication," The Bell System Technical Journal, vol. 27, pp. 379-423, 623-656, Jul., Oct. 1948.

Simpson, W., "PPP in HDLC-Like Framing," Network Working Group, Request for Comments: 1662 (RFC 1662), Jul. 1994, pp. 1-17.

Tanenbaum, Andrew S.: Computer Networks, Third Edition; Pub. 1996; pp. 8, and 179-190 .

International Search Report PCT/US02/09826, ISA, EPO, Dec. 9, 2002.

International Search Report PCT/US02/09829, ISA, EPO, Mar. 4, 2003.

International Search Report PCT/US02/09830, ISA, EPO, Mar. 10, 2003.

International Search Report PCT/US02/09831, ISA. EPO, Mar. 4, 2003.

International Search Report PCT/US02/09832, ISA, EPO Nov. 26, 2002.

International Search Report PCT/US02/09833, ISA, EPO Nov. 26, 2002.

International Search Report PCT/US02/09834, ISA, EPO, Feb. 27, 2003 .

International Search Report PCT/US02/09835, ISA, EPO, Jul.8, 2002 .

International Search Report PCT/US03126897, ISA, EPO, Jan. 16, 2004 .

Foldoc, "Spread-spectrum communications", definition, dated Aug. 8, 2001, from <http://foldoc oivlindex. cgi?query=spread+spectrum>.

Bormann, C, et al., "Robust Header Compression (ROHC)," Internet Draft, Internet Engineering Task Force, Feb. 7, 2001, pp. 1-153, The Internet Society (ISOC), Reston, Virginia, USA.

Bormann, C., et al., "Robust Header Compression (ROHC): Framework and Four Profiles," Internet Draft, Internet Engineering Task Force, Feb. 26, 2001, pp. 1-153, The Internet Society (ISOC), Reston, Virginia, USA.

Yamaguchi, S., "Realization of Multimedia Communications", Unix Magazine, Jun. 1, 1996, pp. 45-53, vol. 11, No. 6, ASCII Corporation, Tokyo, Japan.

Foldoc, "Spread-spectrum communications", definition, dated Aug. 8, 2001, from <http://foldoc.org/index.cgi? query=spread+spectrum>.

Menezes, A. et al.: "Handbook of Applied Cryptography," Chapter 13, pp. 543-590, CRC Press (1996).

Menezes, A. et al.: "Handbook of Applied Cryptography," pp. 497-500, 551-552, CRC Press LIC, USA XP002248262 (1997).

Mooij, W.: "Advances in Conditional Access Technology", IEEE, pp. 461-464 (Sep. 1997).

Schneier, B.: "Applied Cryptography, Conference Key Distribution and Secret Broadcasting" Second Edition, pp. 520, 523-524, John Wiley & Sons, Inc. XP002248263 (1996).

Schneier, B.: "Applied Cryptography," Second Edition, pp. 170, 171, 173, John Wiley & Sons, Inc. (1996).

Stallings, W.: "Cryptography and Network Security," pp. 402-406, 413-417, 421-424, Prentice-Hall, Inc., XP002248261 (1995).

Yamaguchi, S., "Realization of Multimedia Communications", Unix Magazine, ASCII Corporation, Jun. 1, 1996, vol. 11, No. 6, pp. 45-53. International Preliminary Examination Report, PCT/US2002/009833—International Preliminary Examining Authority—US, Jun. 25, 2004.

IEEE. "IEEE STD. 802.11, Part 11; Wireless LAN ;Medium Access Control (MAC) and Physical Layer (PHY) Specifications" 1997, pp. 60-70.

Macq. Benoit M. et al. "Cryptology for Digital TV Broadcast", 1995 IEEE.

Tanenbaum, Andrew S. Computer Networks: Second Edition; Pub 1993 XP2530414.

You Xiaohu, "D&R Progress on China's 3G Mobile Communications", Telecom Science, vol. 2, 2001, pp. 11-17.

"Functional Model of a Conditional Access System", EBU Review—Technical European Broadcasting Union, Bussels, BE, No. 266; Dec. 21, 1995; pp. 64-77; XP000559450.

"TIA/EIA/IS-95-B Mobile Station-Base Station Compatibility Standard for Dual-Mode Wideband Spread Spectrum Cellular System." (IS-95 Standard), Mar. 1999.

3G TS 25.213 V4.1.0 (Jun. 2001) 3rd Generation Partnership Project; Technical Specification Group Radio Access Network; Spreading and Modulation (FDD)(Release 4).

3GPP TS 25.211 V4.2.0 (Sep. 2001) 3rd Generation Partnership Project; Technical Specification Group Radio Access Network; Physical Channels and Mapping of Transport Channels Onto Physical Channels (FDD)(Release 4).

3GPP TS 25.212 V4.2.0 (Sep. 2001) 3rd Generation Partnership Project; Technical Specification Group Radio Access Network; Multiplexing and Channel Coding (FDD)(Release 4).

3GPP TS 25.214 V4.2.0 (Sep. 2001) 3rd Generation Partnership Project; Technical Specification Group Radio Access Network; Physical Layer Procedures (FDD)(Release 4).

3GPP2 C.S0002-0 Version 1.0 (Jul. 1997) 3rd Generation Partnership Project 2 "3GPP2" Physical Layer Standard for cdma2000 Spread Spectrum Systems.

Al-Tawil, "A New Authentication Protocol for Roaming Users in GSM", Proceedings for IEEE International Symposium on Computers and Communication, Jul. 6, 1999, pp. 93-99.

B.G. Marchent et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Baccelli, F et al: "Self Organizing Hierarchical Multicast Trees and Their Optimization," INFOCOM 1999. IEEE, 1081-1089 (Mar. 21, 1999).

Bormann, et al., "Robust Header Compression (ROHC)," Internet Engineering Task Force IETF Draft, 1-145, Feb. 26, 2001.

Brown: "The Electronic Post It Note Model for Mobile Computing Applications," Computing Lab, The University, Canterbury, Kent, The Institution of Electrical Engineers, IEEE, Savoy Place, London, WC2R OBL, UK, 1995.

Estrin, et al., "The Protocol Independent Multicast-Sparse Mode (PIM-SM)," RFC 2362, Jun. 1998.

ETSI:"Universal Mobile Telecommunications Systems (UMTS); Multimedia Broadcast/Multicast Service (MBMS); Stage 1, 3GPP TS 22.146 version 5.2.0 Release 5", Mar. 2002.

ETSI TS 22.146 v5.2.0, pp. 1-15, Mar. 2002.

Waitzman, et al., "The Distance Vector Multicast Routing Protocol (DVMRP)," RFC 1075, Nov. 1, 1998.

Yang et al: "An Efficient Multicast Delivery Scheme to Support Mobile IP," Database and Expert Systems Applications, 1999. IEEE, 638-88 (Sep. 1, 1999).

Pannetrat et al., Authenticating Real-Time Packet Streams and Multibasts, 2002 IEEE. Computers and Communications, 2002. Proceedings. ISCC 2002. Seventh International Symposium on, pp. 490-495.

Baugher et al: "The Secure Real Time Transport Protocol (Draft 09)" Internet Engineering Task Force, AVT Working Froup, Internet-Draft, Jul. 2003, XP002320685.

Meier J.D. et al: "Building Secure ASP.NET Applications: Authentication, Authorization, and Secure Communication: Cryptography and Certificates" Microsoft Patterns & Practices, Nov. 2002, pp. 1-5, XP002321827.

Asaka et al., "Dynamic Multicast Routing Using Predetermined Path Search" Technical Report of IEICE (The Institute of Electronics, Information and Communication Engineers), SSE95-56 IN99-37 CS99-78, Sep. 27, 1999.

Tadaumi, "IP Technology as Communication Infra," The Institute of Electronics Information and Communication Engineers, column 83, No. 4, Apr. 2000, pp. 286-294.

William Stallings: "Cryptography and network security: Principles and Practice" Second Edition, 1999, Prentice Hall, New Jersey.

3GPP TS 25.214 v4.1.0(Jun. 2001) Universal Mobile Telecommunications System (UMTS); Physical layer procedures (FDD), Release 4, ETSI TS 125 214 V4.1.0.

Alfred J. Menezes, Paul C. van Oorschot and Scott A. Vanstone. Handbook of Applied Cryptography, CRC Press. (Oct. 1996): p. 364 (in particular, refer to section 9.6.3), http://www.cacr.math.uwaterloo.ca/hac/about/chap9.pdf.

Brown, D., "Techniques for Privacy and Authentication in Personal Communication Systems," IEEE Personal Communications, vol. 2, No. 4, pp. 6-10, Aug. 1995, doi: 10.1109/98.403452.

Haverinen, et al., "EAP SIM Authentication" draft-haver inen-pppext-eap-sim-11.txt, [online] <URL:http:l/www.watersprings.orglpub/id/draft-haverinen-pppext-eap-sim-11.txt> Jun. 2003, pp. 1-64.

Haverinen H: "EAP SIM Authentication", 3GPP Draft; S3-010663__Draft-Haverinen-Pppext-EAP-SIM-0 2, 3rd Generation Partnership-Project (3GPP), Mobile Competence Centre; 650, Route Des Lucioles ; F-06921 Sophia-Antipolis Cedex ; France, vol. SA WG3, No. Sophia; 20011128, Nov. 28, 2001, XP050271835, [retrieved on Nov. 28, 2001].

JNSA, "Trend of the Latest Security Protocol "IPsecH-with Demonstration Experiment Report for Interconnection," Network Magazine, vol. 6, No. 6, Japan, Jun. 2001, vol. 6, pp. 86-93.

Okamoto, "Encryption Technology for Realizing a Bright Information Society 5: Management of Encryption Key Distribution", Bit, Japan, Kyoritsu Shuppan Co., Ltd., Nov. 1, 1991, vol. 23, No. 12, pp. 51 -59.

Pelletier, et al., "Robust Header Compression (ROHC): A Profile for TCP/IP (ROHC-TCP)", Internet Draft, Feb 21, 2005, pp. 1-2.

TIA/EIA/IS-95-B Mobile Station-Base Station Compatibility Standard for Dual-Mode Wideband Spread Spectrum Cellular System (IS-95 Standard), Feb. 3,1999.

* cited by examiner

| LAYER | PROTOCOLS AND SELECTED OPTIONS FOR SERVICE OPTION XX |
|---|---|
| APPLICATION | MPEG-4 VISUAL, EVRC AUDIO, RTP PAYLOAD TYPES |
| TRANSPORT | RTP/UDP PORT NUMBER |
| SECURITY | UNSPECIFIED |
| NETWORK | IP |
| HEADER COMPRESSION | ROHC |
| LINK | HDLC-TYPE FRAMING |
| RLP | NULL |
| MULTIPLEX | BSPM |
| PHYSICAL | BSPM |

FIG. 4

| | |
|---|---|
| NGHBR_PN | 9 |
| NGHBR_FBSCH_CODE | 1 |
| NGHBR_FBSCH_CODE_CHAN | 0 OR 11 |
| HSBS_ID | 0 OR 5 |
| BSR_ID | 3 |
| HSBS_ID | 3 |
| FBSCH_ID | 3 |
| FBSCH_ID | 3 |

FIG. 16

| | |
|---|---|
| PILOT_PN | 9 |
| BSPM_MSG_SEQ | 6 |
| HSBS_REG_USED | 1 |
| HSBS_REG_TIMER | 0 OR 5 |
| NUM_FBSCH | 3 |
| NUM_HSBS_SESSION | 3 |
| NUM_LPM_ENTRIES | 3 |
| FBSCH_ID | 3 |
| FREQ_INCL | 1 |
| FBSCH_CDMA_FREQ | 0 OR 11 |
| FBSCH_CODE_CHAN | 11 |
| FBSCH_RC | 5 |
| FBSCH_RATE | 4 |
| FBSCH_FRAME_SIZE | 2 |
| FBSCH_FRAME_REPEAT_IND | 1 |
| FBSCH_SHO_SUPPORTED | 1 |
| NUM_NGHBR | 0 OR 6 |

| LAYER | PROTOCOLS | BROADCAST SERVICE BLOB FIELDS |
|---|---|---|
| APPLICATION | IDENTIFIED IN BLOB | VISUAL/AUDIO CODECS, PROFILES, RTP PAYLOAD TYPES |
| TRANSPORT | IDENTIFIED IN BLOB | TRANSPORT PROTOCOL, UDP PORT NUMBER |
| SECURITY | UNSPECIFIED | |
| NETWORK | IP | |
| HEADER COMPRESSION | IDENTIFIED IN BLOB | HEADER COMPRESSION ALGORITHM & PARAMETERS |
| LINK | HDLC-LIKE FRAMING | |
| RLP | NULL | |
| MULTIPLEX | IDENTIFIED IN BSPM | |
| PHYSICAL | IDENTIFIED IN BSPM | |

FIG. 17

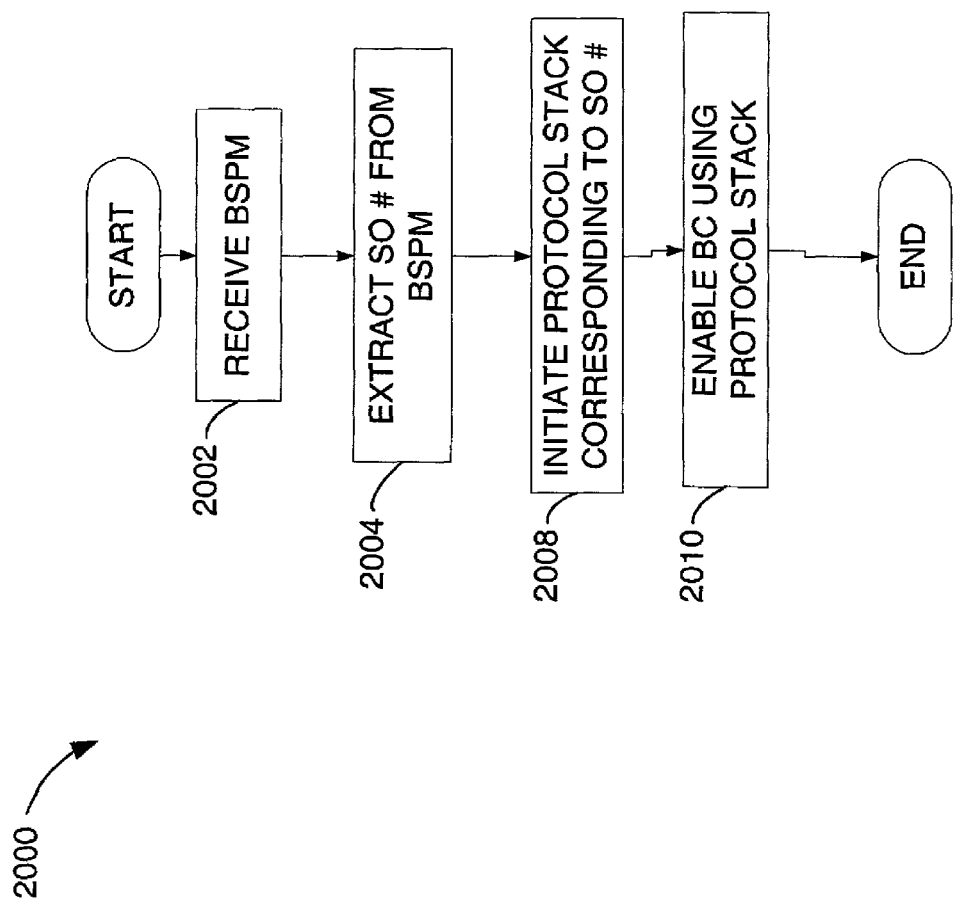

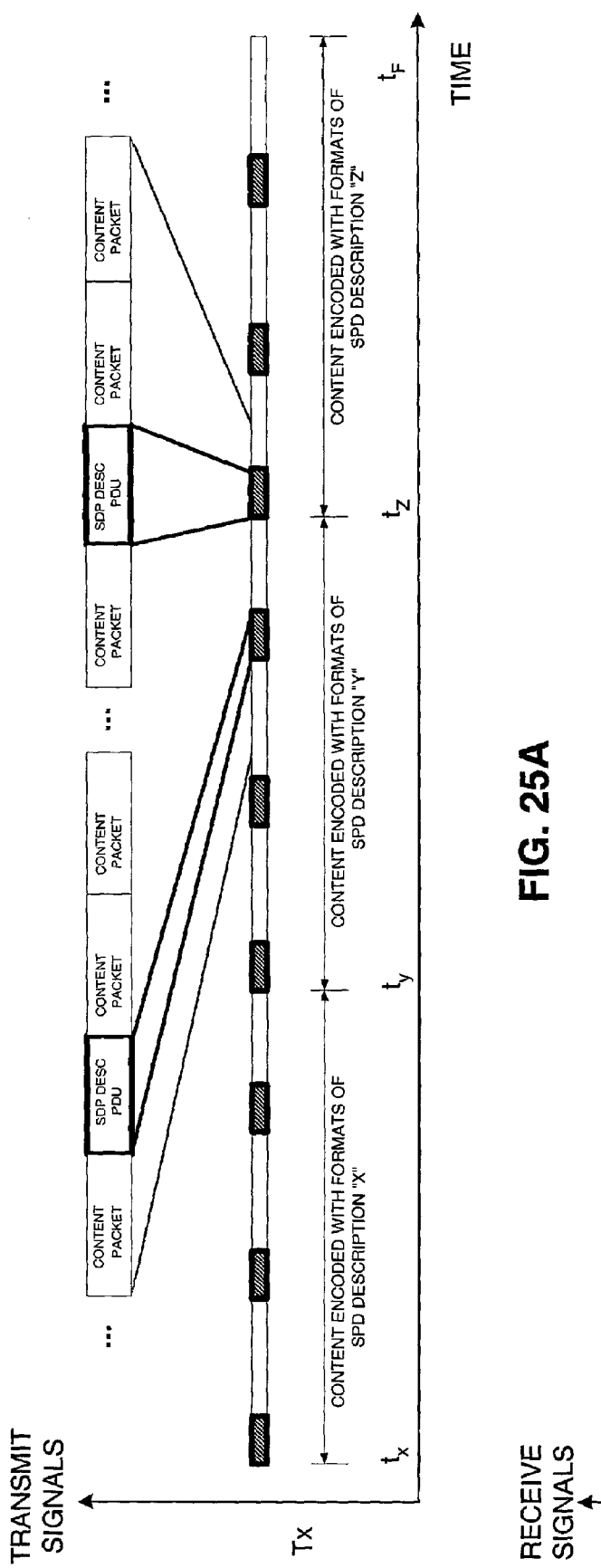
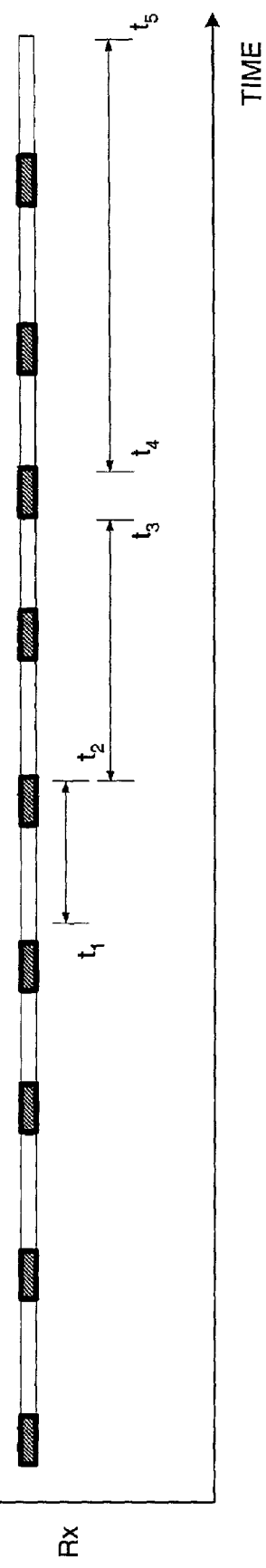
FIG. 25A
FIG. 25B

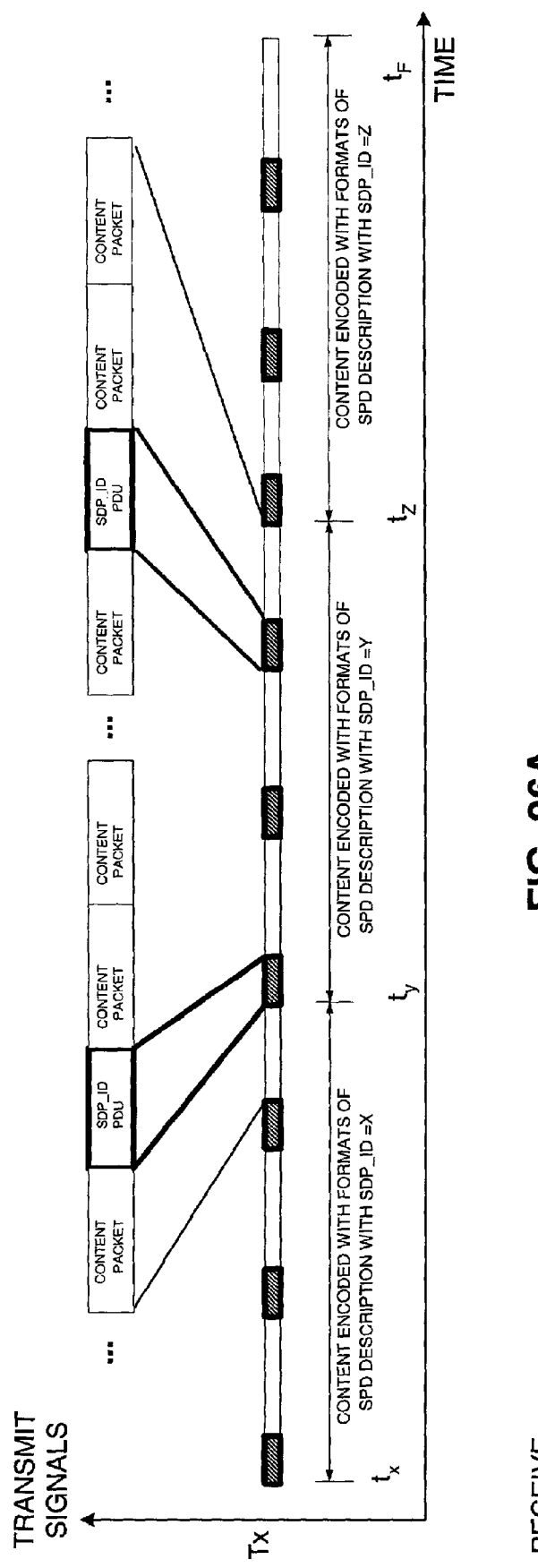
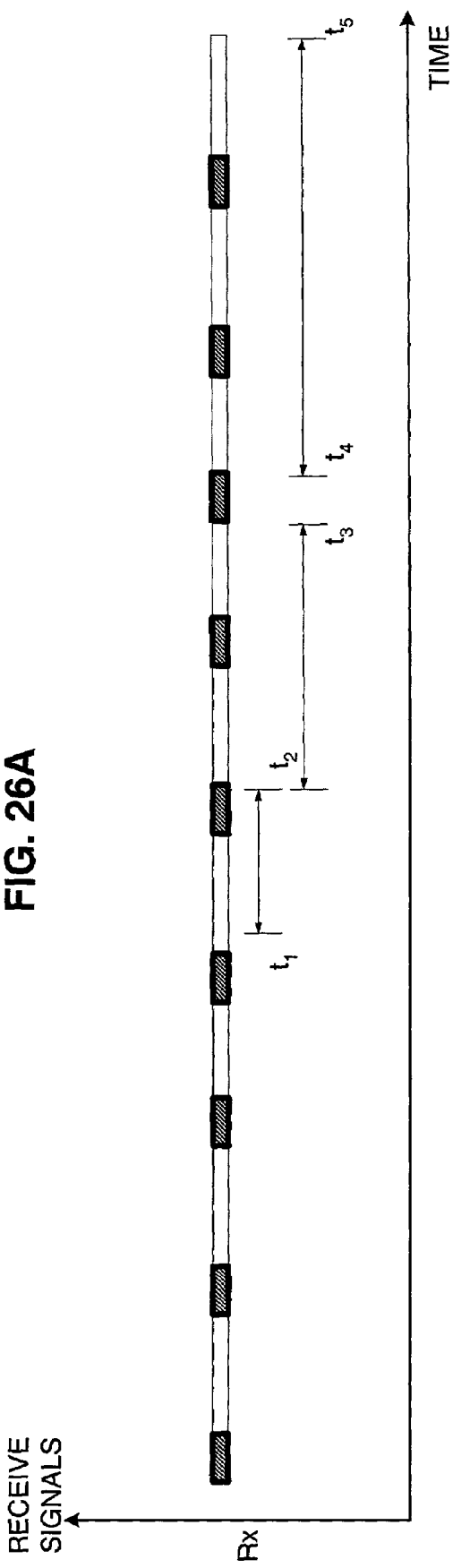
FIG. 26A
FIG. 26B

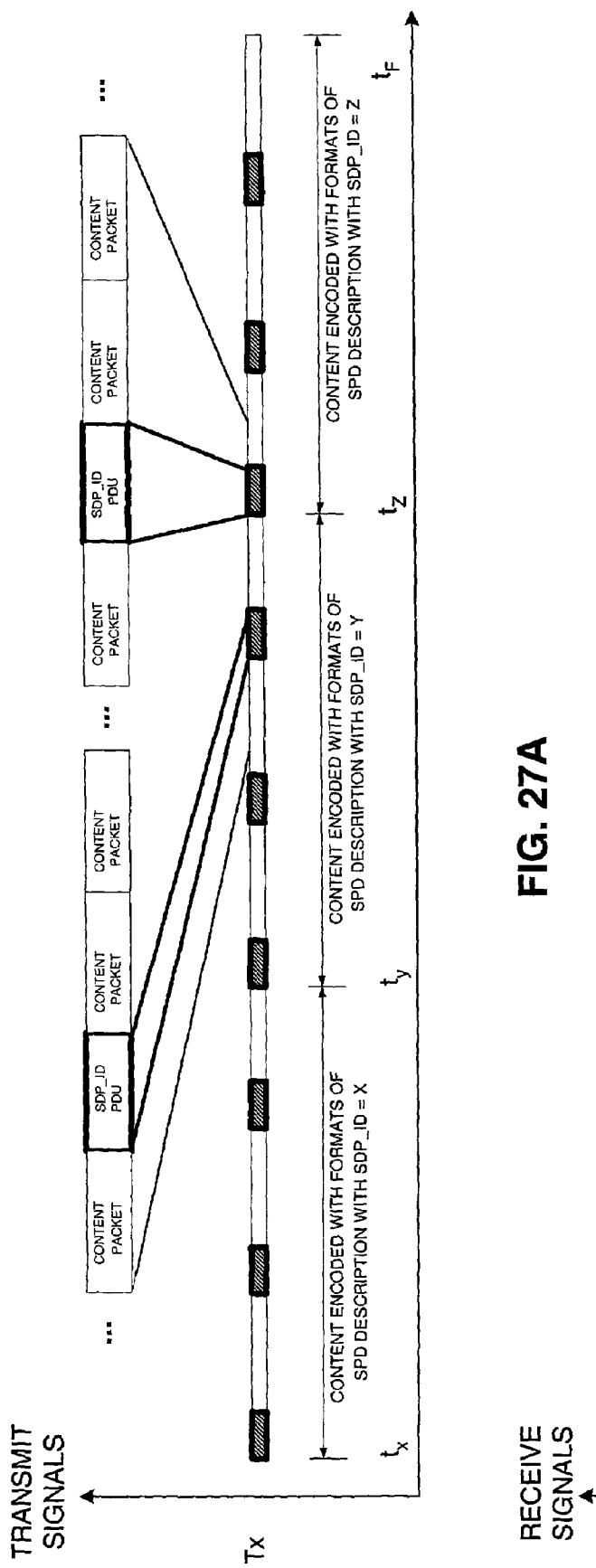
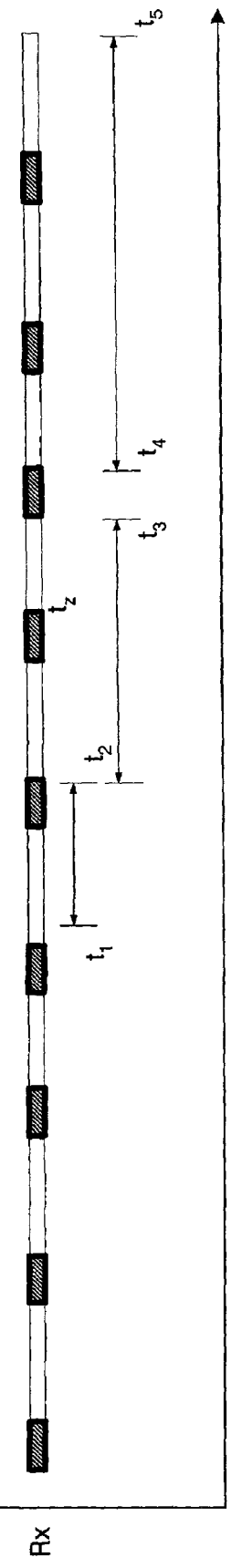
FIG. 27A
FIG. 27B

| Field | Length (octets) |
|---|---|
| CONTROL | 1 |
| CURRENT_SDP_ID | 1 |
| CURRENT_SDP_LIFE | 6 |
| NEXT_SDP_ID | 0 or 1 |
| INCL_SDP_DESC_ID | 0 or 1 |
| INCL_SDP_DESC | 0 or Variable |

FIG. 28

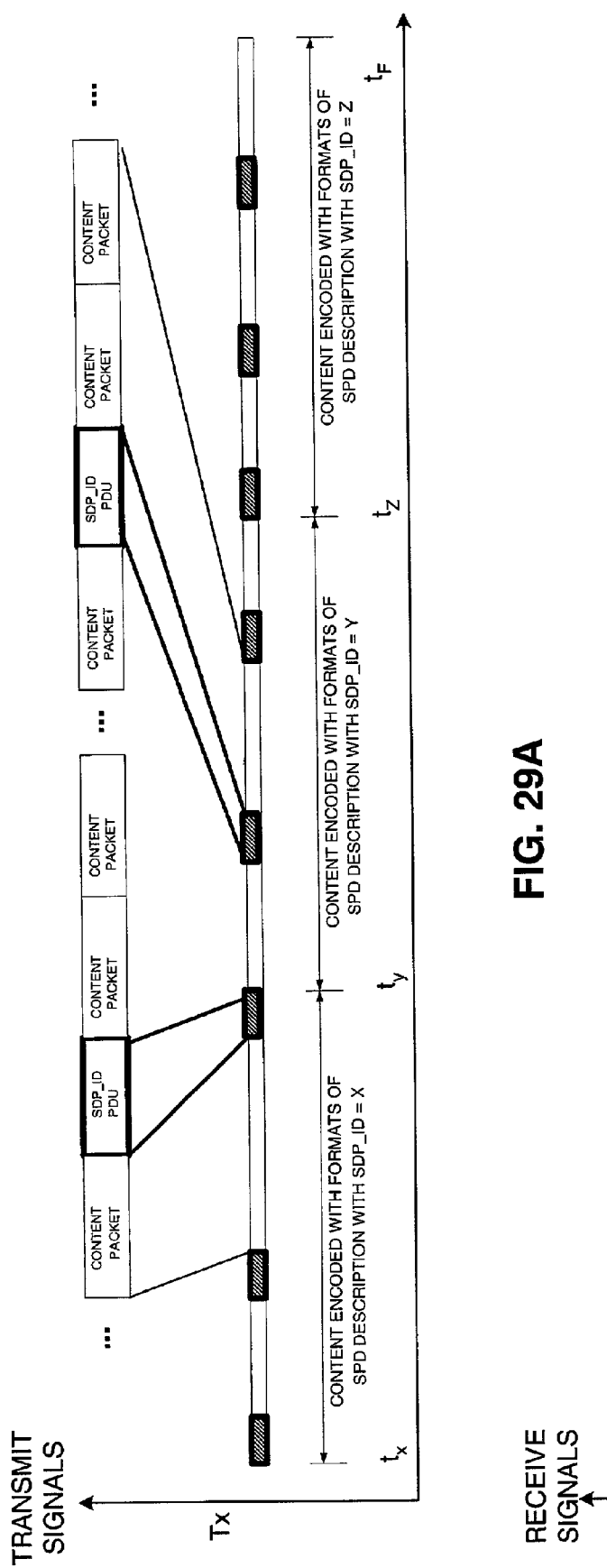
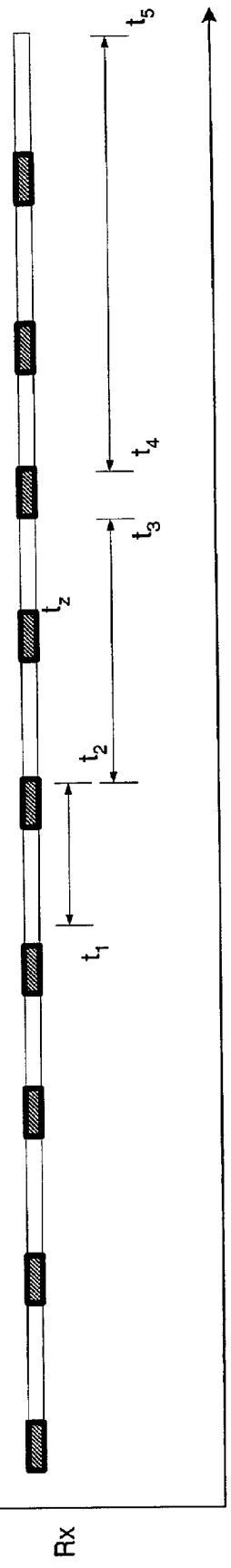
FIG. 29A
FIG. 29B

METHOD AND APPARATUS FOR PROVIDING PROTOCOL OPTIONS IN A WIRELESS COMMUNICATION SYSTEM

CLAIM OF PRIORITY

The present Application for Patent is a continuation-in-part of U.S. application Ser. No. 09/933,914 filed Aug. 20, 2001, which claims priority of U.S. Provisional Application No. 60/279,970, filed Mar. 28, 2001, both assigned to the assignee hereof and hereby expressly incorporated by reference herein.

REFERENCE TO CO-PENDING APPLICATION

The present Application for Patent is related to U.S. patent application Ser. No. 09/970,487, entitled "METHOD AND APPARATUS FOR DATA PACKET TRANSPORT IN A WIRELESS COMMUNICATION SYSTEM USING AN INTERNET PROTOCOL," filed Oct. 3, 2001, issued as U.S. Pat. No. 7,697,523, assigned to the assignee hereof and hereby expressly incorporated by reference herein; and U.S. application Ser. No. 10/032 775, entitled "METHOD AND APPARATUS FOR PROVIDING MULTI-LAYER TRANSMISSIONS IN A WIRELESS COMMUNICATION SYSTEM," filed concurrently herewith, now abandoned, and which is expressly incorporated by reference herein.

BACKGROUND

1. Field

The present invention relates to wireless communication systems generally and specifically, to methods and apparatus for providing protocol options for a broadcast transmission in a wireless communication system.

2. Background

There is an increasing demand for packetized data services over wireless communication systems. As traditional wireless communication systems are designed for voice communications, the extension to support data services introduces many challenges. Specifically, provision of uni-directional services, such as broadcast service where video and audio information is streamed to a subscriber, has a unique set of requirements and goals. Such services may have large bandwidth requirements, wherein system designers seek to minimize transmission of overhead information. Additionally, the subscriber requires specific information to access the broadcast transmissions, such as processing parameters and protocols. A problem exists in transmitting the broadcast-specific information while optimizing use of available bandwidth.

There is a need, therefore, for an efficient and accurate method of transmitting data in a wireless communication system. Further, there is a need for an efficient and accurate method of providing service-specific information to a user.

SUMMARY

Embodiments disclosed herein address the above stated needs by providing a method for providing protocol options for a broadcast transmission in a data processing system.

In one aspect, in a wireless communication system supporting a broadcast service, a method includes transmitting a broadcast session on a broadcast transmission channel, and transmitting broadcast overhead information corresponding to the broadcast session on an overhead transmission channel. The broadcast service is transmitted by a content server. The broadcast service has a corresponding protocol stack having an application layer and a transport layer, wherein the content server independently controls the application layer and the transport layer protocols.

In another aspect, in a wireless communication system supporting a broadcast service, a method includes receiving broadcast overhead information corresponding to the broadcast session on an overhead transmission channel, accessing the broadcast session on a broadcast transmission channel, and using the broadcast overhead information to process broadcast content of the broadcast session.

BRIEF DESCRIPTION OF THE DRAWINGS

FIG. 4 is a table of protocols applied to layers of a protocol stack supporting a broadcast service option in a wireless communication system.

FIG. 16 is a system overhead parameter message configuration.

FIG. 17 is a block of bits system overhead parameter message configuration.

FIG. 18 is a flow diagram for provision of broadcast protocols and parameters in a wireless communication system.

FIG. 25A is a timing diagram of transmission of broadcast overhead information multiplexed with broadcast content in a broadcast stream in a wireless communication system.

FIG. 25B is a timing diagram of a received broadcast transmission stream including broadcast overhead information multiplexed with broadcast content.

FIG. 26A is a timing diagram of transmission of broadcast overhead information identifiers multiplexed with broadcast content in a broadcast stream in a wireless communication system.

FIG. 26B is a timing diagram of a received broadcast transmission stream including broadcast overhead information identifiers multiplexed with broadcast content.

FIG. 27A is a timing diagram of transmission of broadcast overhead information identifiers and broadcast overhead information multiplexed with broadcast content in a broadcast stream in a wireless communication system.

FIG. 27B is a timing diagram of a received broadcast transmission stream including broadcast overhead information identifiers and broadcast overhead information multiplexed with broadcast content.

FIG. 28 is an illustration of fields in a broadcast overhead information identifier.

FIG. 29A is a timing diagram of transmission of broadcast overhead information identifiers multiplexed with broadcast content in a broadcast stream in a wireless communication system.

FIG. 29B is a timing diagram of a received broadcast transmission stream including broadcast overhead information multiplexed with broadcast content.

DETAILED DESCRIPTION

Figure 1:
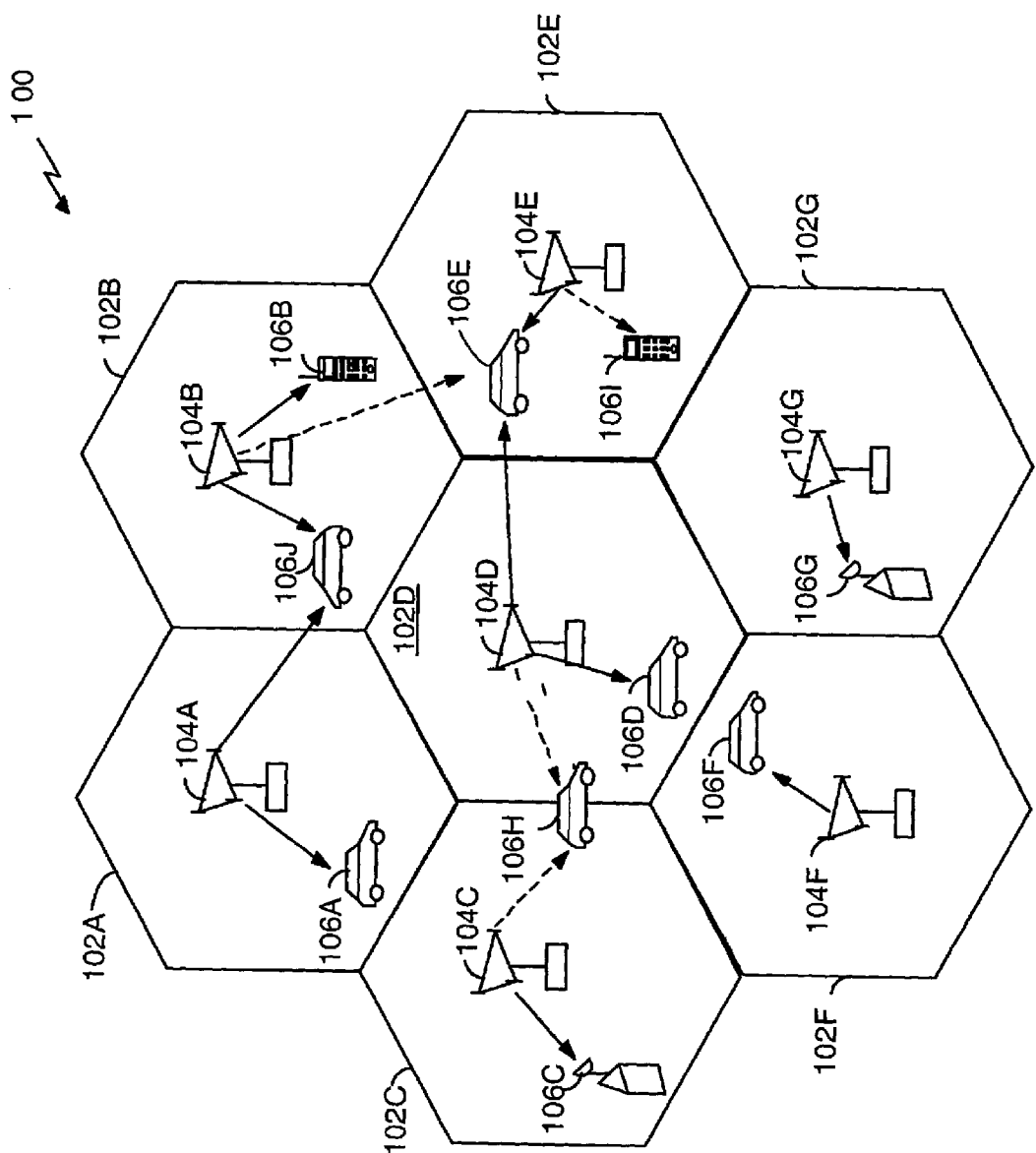
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the present invention are presented in drawings, the drawings are not necessarily drawn to scale unless specifically indicated.

An exemplary embodiment of a wireless communication system employs a method of header compression that reduces the size of each header while satisfying the accuracy and transmission requirements of the system. The exemplary embodiment supports a uni-directional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

The following discussion develops the exemplary embodiment by first presenting a spread-spectrum wireless communication system generally. Next, the broadcast service is introduced, wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed Note that the exemplary embodiment is provided as an exemplar throughout this discussion; however, alternate embodiments may incorporate various aspects without departing from the scope of the present invention. Specifically, the present invention is applicable to a data processing system, a wireless communication system, a uni-directional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on Code Division Multiple Access (CDMA), Time Division Multiple Access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System," which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
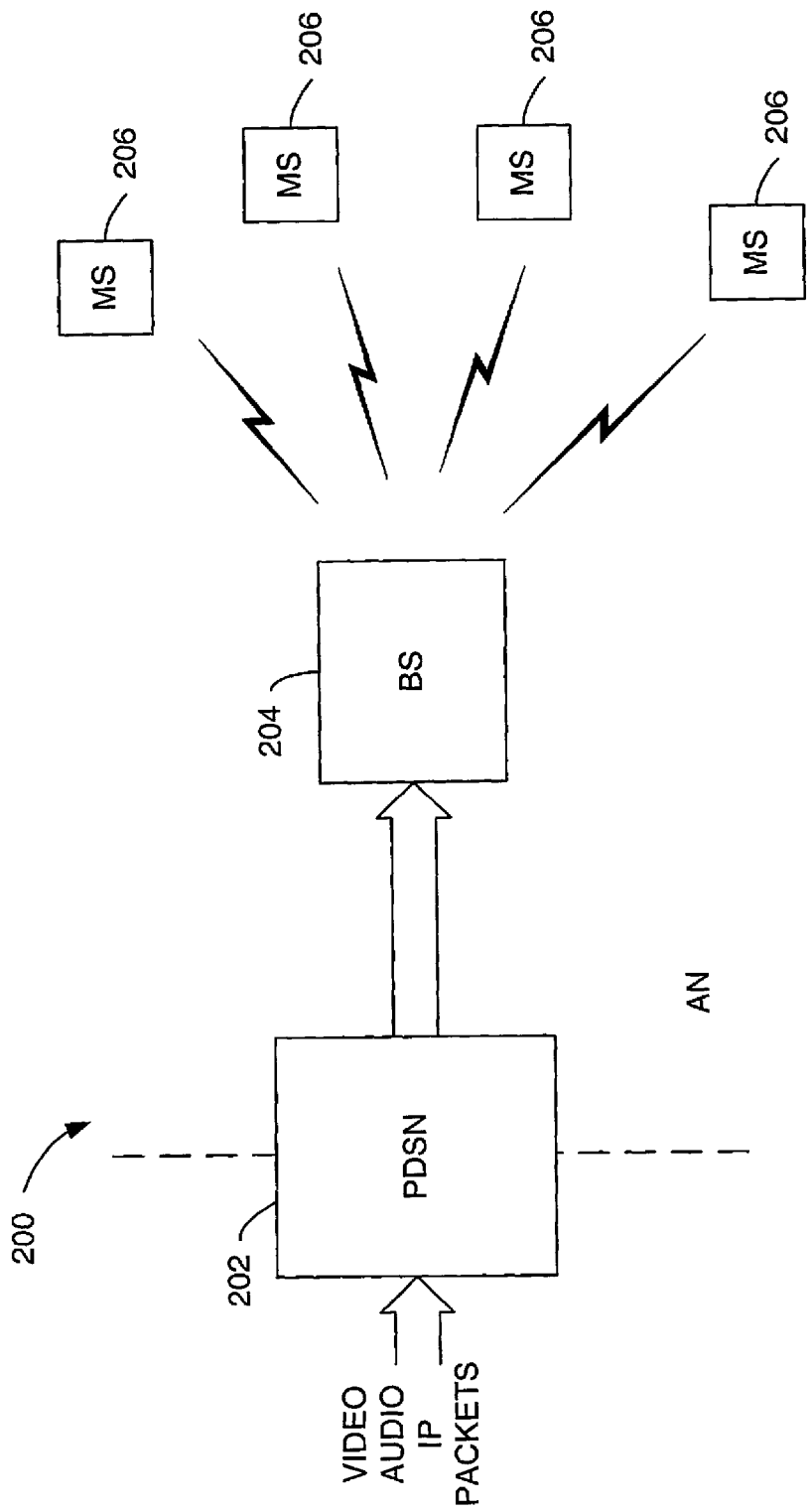
FIG. 2 is a block diagram of the communication system supporting broadcast transmissions.

A wireless communication system 200 is illustrated in FIG. 2, wherein video and audio information is provided to Packetized Data Service Network (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single CDM channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as a Content Server (CS), wherein the CS advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast content may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into substreams of lower rates.

One embodiment also supports group calls in several different ways. For example, by using existing unicast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the F-BSCH of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing of the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Model

There are several possible subscription/revenue models for HSBS service, including free access, controlled access, and partially controlled access. For free access, no subscription is needed by the to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not being able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
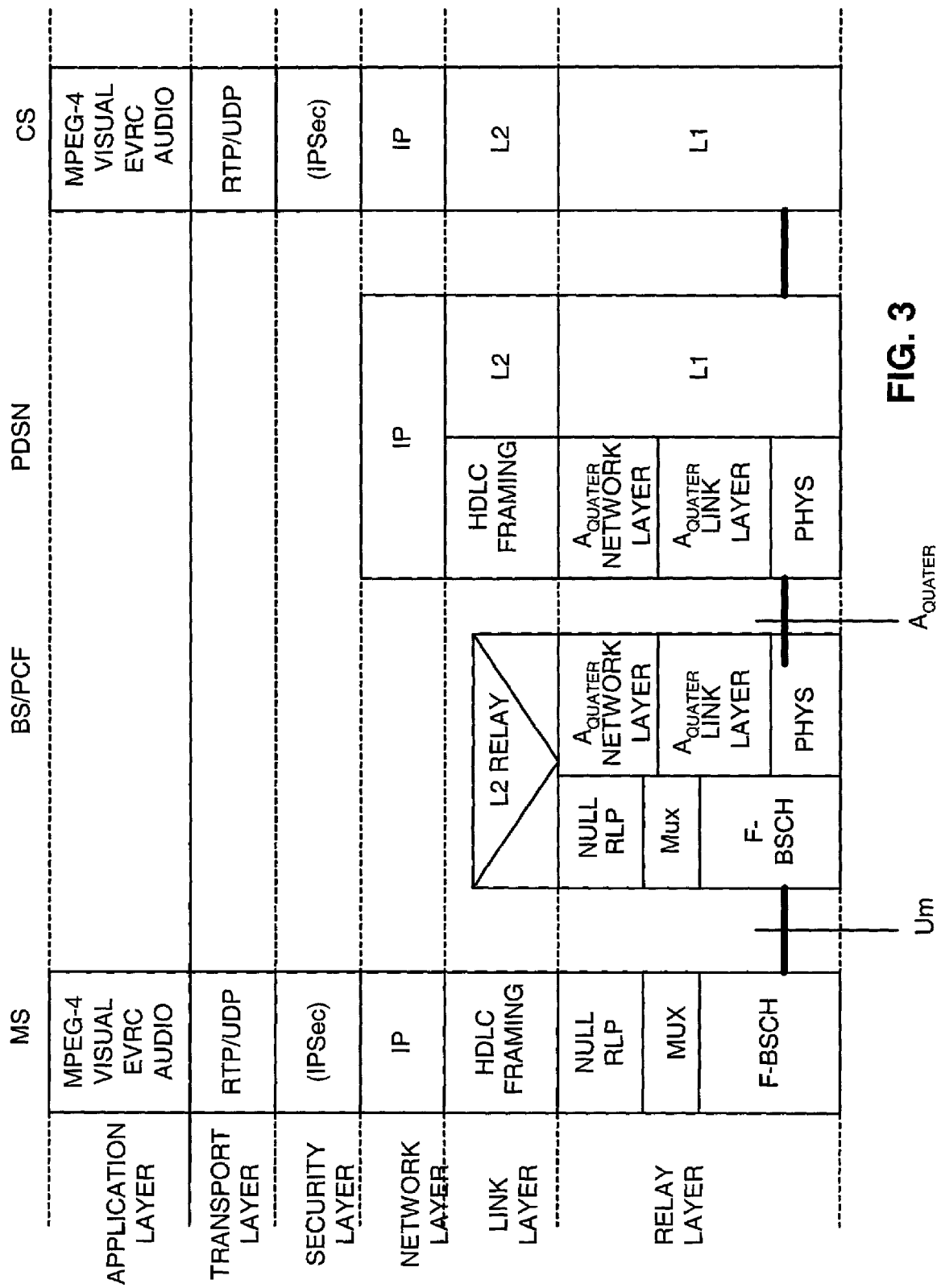
FIG. 3 is a model of the protocol stack corresponding to a broadcast service option in a wireless communication system.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port to be used to carry the RTP packets. The security layer of the MS is specified by the protocol, wherein security parameters are provided via out-of-band channels when the security association is initially established with the CS. The link layer specifies the IP header compression parameters.

In order for the mobile stations to discover and listen to broadcast channels successfully, various broadcast service related parameters are transmitted over the air interface. The broadcast service is designed to support different protocol options in the protocol stack. This requires the receivers of the broadcast service be informed of the protocol options selected to facilitate proper decoding and processing of the broadcast. In one embodiment, the CS provides this information to the receiver as an overhead system parameter message, consistent with cdma2000 standard. The advantage to the receiver is the ability to receive the information immediately from the overhead message. In this way, the receiver may immediately determine whether the receiver has sufficient resources to receive the broadcast session. The receiver monitors the overhead system parameter messages. The system may implement a service option number corresponding to a set of parameters and protocols, wherein the service option number is provided in the overhead message. Alternately, the system may provide a set of bits or flags to indicate the different protocol options selected. The receiver then determines the protocol options for decoding the broadcast session correctly.

The broadcast channel is a physical channel defined to carry broadcast traffic. There are several possible physical layer formats that can be used for a given broadcast channel, and therefore, the mobile station receivers require information about these parameters to successfully decode the physical transmission of the broadcast channel. Specifically, each broadcast channel, HSBS channel, has a unique identifier in the system. Additionally, for each HSBS channel the BS assigns a Broadcast Service Reference Identifier, wherein the base station sets the field corresponding to the current Broadcast Service Session. The broadcast service will then transmit information for each HSBS channel including: the broadcast channel identifier and the broadcast service reference identifier.

Further, the broadcast channel may incorporate various combinations of upper layer protocols, based on the type of content being delivered. The mobile receiver also requires information relating to these upper layer protocols for interpretation of the broadcast transmissions. According to one embodiment, the protocol stack is communicated via out-of-band methods, wherein out-of-band method indicates the transmission of information via a separate channel distinct from the broadcast channel. With this approach, the description of the upper layer protocol stack is not transmitted over the broadcast channel or overhead system parameters channel.

As discussed hereinabove, the service option defines the protocol stack and the procedures used for operating the broadcast service. Consistent with a uni-directional service, the broadcast service is characterized by protocol options common among multiple broadcast receivers. In the exemplary embodiment, protocol options for the broadcast service are not negotiated between the mobile station and the network. The options are predetermined by the network and are provided to the mobile station. As the broadcast service is a uni-directional service, the broadcast service does not support requests from the mobile station. Rather the concept of the broadcast service is similar to a television transmission, wherein receivers tune in to the broadcast channel and access the broadcast transmission using the parameters specified by the CS.

Figure 15:
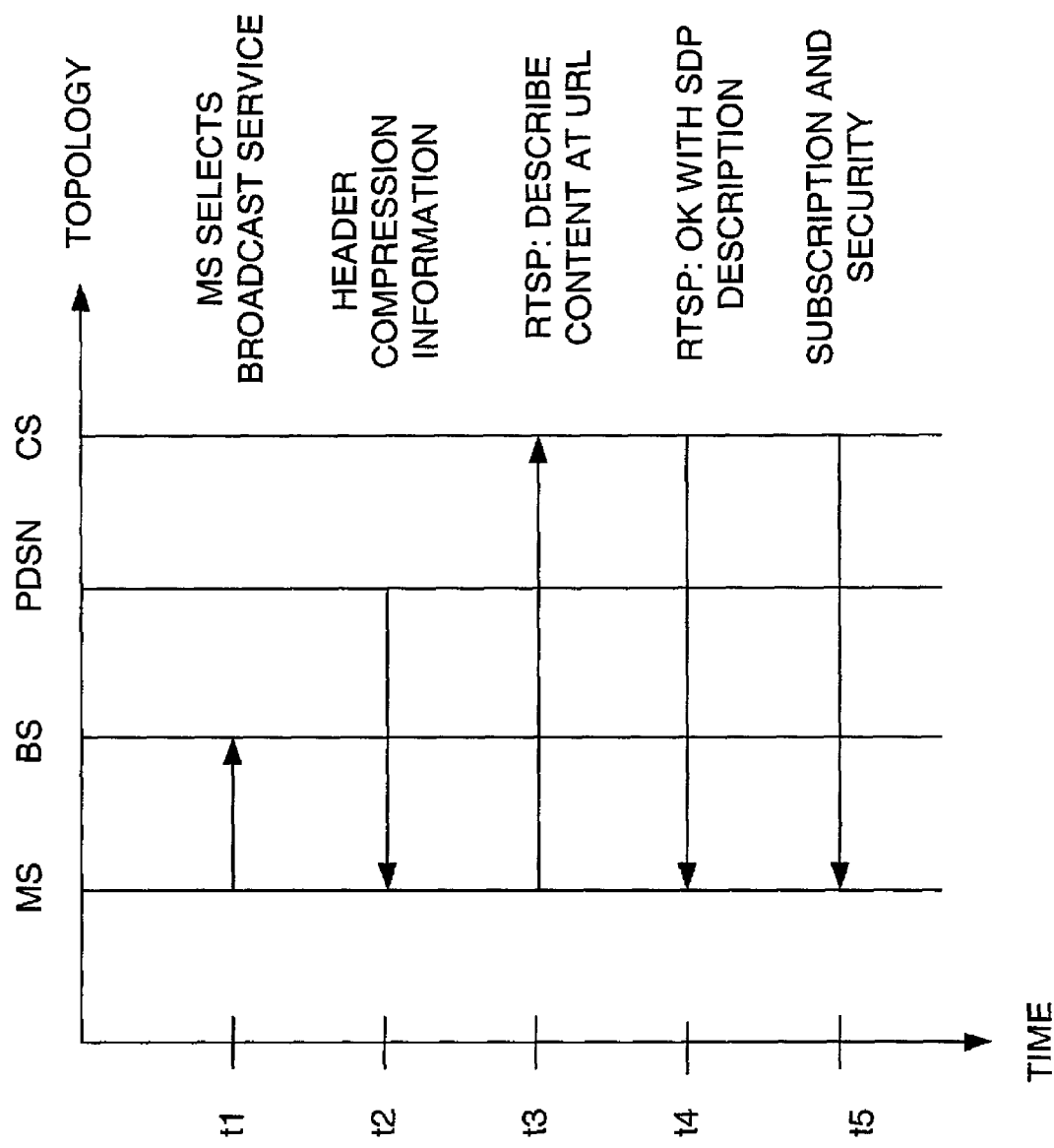
FIG. 15 is a timing diagram of a message flow in a wireless communication system.

To avoid requiring coordination between the wireless network and CS, the service can use out-of-band channels for transmitting information to the mobile station regarding the protocol options above the IP network layer. FIG. 15 illustrates a broadcast flow according to one embodiment. The horizontal axis represents the topology of the system, i.e., infrastructure elements. The vertical axis represents the time line. At time t1 the MS accesses the out-of-band channel via the BS. Note that the MS may access the network by selecting a packet data service option, such as by using a dedicated packet data service option channel designated as SO 33. Effectively, the MS selects a packet data service option to establish a Real Time Streaming Protocol (RTSP) session with the CS. The MS requests a description of the application and transport protocols used for the broadcast stream from the CS at time t3. Note that in addition to the use of RTSP, the Session Initiation Protocol (SIP) may also be used to request the description of the application and transport protocols. The description is carried via Session Description Protocol (SDP) at time t4. Note that the Session Description Protocol is a defined format for conveying sufficient information to discover and participate in a multimedia or other broadcast type session. In one example, an SDP is specified in RFC 2327 entitled "SDP: Session Description Protocol" by M. Handley and V. Jacobson, dated April 1998, which is hereby expressly incorporated by reference herein. Transmission of the protocol may be performed while the user is accessing the broadcast service. Note that RTSP and SDP are standardized approaches for establishing a uni-directional streaming service in IETF and in 3GPP2. The mobile station will also use a packet data service to request the PDSN to identify the broadcast service header compression protocol and relay any compression initialization information to the mobile station at time t2. In one embodiment, Internet Protocol Control Protocol IPCP is used to exchange the header compression information with the mobile station. Similarly, this same mechanism may be extended to provide information for the broadcast stream.

If the broadcast service protocol options change the mobile station requires notification. One embodiment applies a Security Parameters Index (SPI) to indicate when protocol options may have changed. If the protocol options change as a result of using a different CS for the system, or the mobile station handing off to a different system, the SPI will change automatically because the source IP address of the CS changes. Furthermore, if the CS does not change and the same one is used with different protocol options, the CS will be required to change the SPI to indicate that the parameters have changed. When the mobile station detects this new SPI, it will obtain the new protocol description by setting-up a packet data service call and contacting the PDSN and CS whose IP address is included in the SPI.

In one embodiment, the SPI approach applies several criteria. Firstly, a single CS uses the same protocol options for consecutive streaming sessions, else the CS modifies the SPI when the protocol options change. Secondly, the PDSN does not change the header compression algorithm or the parameters between streaming sessions with the same SPI.

The change of protocol options in a given system triggers multiple mobile stations to set-up a packet data service call to retrieve the updated protocol descriptions. Randomized call set-up delays should be introduced to prevent the system from being overloaded by these call originations. Content servers may introduce some delay between the time the SPI is changed and the content stream begins to allow all users to retrieve the protocol options.

In contrast the broadcast channel protocols and parameters may be transmitted to the mobile station. In an alternate embodiment, a Service Option (SO) number is assigned to each set of broadcast protocols and parameters, wherein the SO number is transmitted to the multiple receivers. In a derivation thereof, the parameter information is transmitted to the multiple receivers directly as a plurality of coded fields. The former method of identifying broadcast protocols and parameters by the SO number, incorporates a Broadcast Service Parameters Message (BSPM). This BSPM is an overhead message specific to the broadcast service. Those mobile stations desiring to receive the HSBS service would monitor the BSPM. The BSPM is continuously; transmitted periodically by each sector that has configured one or more broadcast channels.

The format of the BSPM of the exemplary embodiment is illustrated in FIG. 16. The various parameters indicated in the message are listed with the number of bits allocated in the message for each. The pilot PN sequence offset index is identified as PILOT_PN. The BS sets the PILOT_PN field to the pilot PN sequence offset for the corresponding base station in units of 64 PN chips. The BSPM_MSG_SEQ refers to a broadcast service parameters message sequence number. When any of the parameters identified in a current BSPM has changed since the previous transmission of the BSPM, the BS increments the BSSPM_CONFIG_SEQ. The HSBS_REG_USED is a broadcast service registration used indicator. This field indicates the frequencies used for paging a MS subscriber to the broadcast service. The HSBS_REG_TIME is a broadcast service registration timer value. If the field HSBS_REG_USED is set to '0', the base station will omit this field. Else, the base station includes this field with significance given as: the BS sets this field to the length of the registration duration for the broadcast service channels; or the base station sets this field to '00000' if the MS is required to register the HSBS channel each time it starts to monitor a HSBS channel.

Continuing with FIG. 16, the NUM_FBSCH is the number of forward broadcast supplemental channels. The BS sets this field to the number of forward broadcast supplemental channels transmitted by the corresponding BS. The NUM_HSBS_SESSION is a number of broadcast service sessions. The BS sets this field to the number of broadcast service sessions being transmitted by the corresponding BS. The NUM_LPM_ENTRIES are the number of logical-to-physical mapping entries. The BS sets this field to the number of logical, i.e., broadcast service sessions, to physical, i.e. forward broadcast supplemental channel, mapping entries carried in this message. The BS sets a Forward Broadcast Supplemental Channel Identifier, FBSCH_ID, corresponding to the forward broadcast supplemental channel. If the CDMA_FREQ field is included in this record, the base station shall set the Frequency included indicator, FREQ_INCL, bit to '1'; otherwise, the base station will set the bit to '0'.

FBSCH_CDMA_FREQ is the frequency assignment of the forward broadcast supplemental channel. If the FREQ_INCL bit is set to '0', the base station shall omit this field; otherwise, the base station sets this field as follows: the base station shall set this field to the CDMA Channel number corresponding to the CDMA frequency assignment for the CDMA Channel containing the Forward Broadcast Supplemental Channel.

The FBSCH_CODE_CHAN is a code channel index of the forward broadcast supplemental channel, wherein the base station sets this field to the code channel index that the mobile station is to use on the forward broadcast supplemental channel. The FBSCH_RC is a radio configuration of the forward broadcast supplemental channel, wherein the BS sets this field to the radio configuration to be used by the mobile station on the forward broadcast supplemental channel.

The FBSCH_RATE is the data fate of the forward broadcast supplemental channel, wherein the base station sets this field to the data rate used on the forward broadcast supplemental channel. The FBSCH_FRAME_SIZE is the frame size of the forward broadcast supplemental channel, wherein the base station sets this field to the frame size on the forward broadcast supplemental channel. The FBSCH_FRAME_REPEAT_IND is the Forward Broadcast Supplemental Channel Frame Repeat Indicator, wherein if frame repetition is used on the Forward Broadcast Supplemental Channel, the base station sets this field to '1'; else, the base station sets this field to '0'.

The FBSCH_SHO_SUPPORTED is the Forward Broadcast Supplemental Channel Soft Handoff Supported Indicator, wherein if the base station supports soft handoff on the Forward Broadcast Supplemental Channel with one or more of it's neighbors, the base station sets this field to '1'; otherwise, the base station sets this field to '0'.

The NUM_NGHBR is the number of neighbors supporting forward broadcast supplemental channel soft handoff. If the field FBSCH_SHO_SUPPORTED is set to '1', then the base station will set this field to the number of neighbors supporting soft handoff on this Forward Broadcast Supplemental Channel. The NGHBR_PN is the neighbor pilot PN sequence offset index. The base station sets this field to the pilot PN sequence offset for this neighbor, in units of 64 PN chips. The NGHBR_FBSCH_CODE_CHAN_INCL is the neighbor pilot forward broadcast supplemental channel code channel index included indicator. If the neighbor pilot Forward Broadcast Supplemental Channel Code Channel index is included in this message, the base station sets this field to '1'; otherwise, the base station sets this field to '0'. The NGHBR_FBSCH_CODE_CHAN is the neighbor pilot Forward Broadcast Supplemental Channel Code Channel Index. If the NGHBR_FBSCH_CODE_CHAN_INCL field is set to '0', the base station omits this field; otherwise, the base station includes this field and the BS sets this field to the code channel index that the mobile station is to use on this Forward Broadcast Supplemental Channel on this neighbor.

The HSBS_ID is a broadcast service session identifier, wherein the base station shall set this field to the identifier corresponding to this Broadcast Service Session. The BSR_ID is a broadcast service reference identifier, wherein the base station shall set this field to the broadcast service reference identifier corresponding to this broadcast service session. The HSBS_ID is the broadcast service session identifier, wherein the BS shall set this field to the identifier corresponding to the broadcast service session.

The FBSCH_ID is the forward broadcast supplemental channel identifier, wherein the base station shall set this field to the identifier corresponding to the forward broadcast supplemental channel on which the above broadcast service session is being carried.

The protocol options that would require negotiation between the transmitter and the receiver are selected and defined in the service option description. The MS uses the SO number sent in the BSPM to discover the protocol options of the broadcast service. In contrast to a uni-directional packet data service wherein the SO specifies the protocols up to the IP network layer, the broadcast service specifies protocols up to the application layer. The security layer uses the encryption and authentication algorithms communicated during the establishment of a security association, e.g., via out-of-band means.

In the exemplary embodiment, the transport layer is specified in the SO as the applied transport protocol, such as RTP, may not be readily identified as the payload of the UDP packets. The SO will also specify a UDP port number for the RTP payload to distinguish this from other types of UDP traffic that may be sent over the broadcast channel.

The application layer is also specified in the SO as many audio and video codecs (e.g., MPEG-4 and EVRC) do not have static RTP payload types that are readily identified by the mobile station. In a uni-directional broadcast application, the RTP payload types for these codecs have to be dynamically assigned via call-set-up negotiation (e.g., using SIP, RTSP, etc.). Since the broadcast service desires to avoid such negotiation, the media decoders are preselected by the SO. Furthermore, since the audio and visual data may be carried in separate RTP packets, it is desired to specify the RTP payload types to be used by each media stream.

In the exemplary embodiment, the logical-to-physical mapping specifies the HSBS channel (HSBS_ID/BSR_ID) carried in a corresponding F-BSCH (FBSCH_ID). The set {HSBS_ID, BSR_ID, FBSCH_ID} completely specifies (for the MS) where to find and listen to a given broadcast service. As such, the logical-to-physical mapping information is transmitted over the air to the MSs such that a MS desiring to access to a given HSBS channel may determine the F-BSCH channel to monitor. Therefore, the following information is transmitted to the mobile station over the air interface: Broadcast physical channel parameters; Broadcast logical channel parameters; Logical-to-physical mapping; and One option to signal these broadcast service parameters is to define a new overhead message in cdma2000 that is specific to broadcast service.

An alternate embodiment applies the BSPM, wherein the individual parameters are transmitted in a Block Of Bits, referred to as BLOB that contains selectable program options. Unlike the use of a SO number to identify a set of parameters, wherein the protocol options at the application layer change often thus requiring redefinition, the use of the BLOB allows changes at the application layer without redefinition of the entire set of parameters. Specifically, the BLOB allows redefinition of a single parameter without changing the entire set of parameters. If the broadcast service is to support many different protocol options, the problem of defining multiple service options in the previous section can be mitigated by defining a broadcast service BLOB. This BLOB is sent as part of the BSPM and identifies the protocol options used for the broadcast service. FIG. 17 illustrates the protocol stack and application of the BLOB. The provision of the BLOB provides the advantage that the mobile station uses the BSPM to identify the protocol stack, and therefore, other out-of-band channels are not required for transmission of this information.

Additionally, the mobile station can immediately determine the ability to access and decode the broadcast stream without having to register for the service.

A disadvantage of using the SO and/or the BLOB description is the use of wireless infrastructure to coordinate the protocols used above the IP network layer. The protocols used by the CS and PDSN must match those defined in the BLOB sent by the base station.

One means of providing coordination is to have a client in the wireless infrastructure (e.g., BSC) request the protocol option information from the CS and the PDSN. The BSC then translates this information into the corresponding broadcast service BLOB sent in the BSPM. The protocols used between the BSC client and the content server and PDSN will be based on standard protocols, such as those specified in cdma2000. The client in the BSC uses RTSP to request a description of the application and transport layers from the CS using SDP. The client also uses IPCP to request the header compression information from the PDSN. To limit the number of protocols the mobile station has to support, mandatory and optional protocol options should be defined for the broadcast service.

FIG. 18 illustrates a method 2000 of providing broadcast service parameter and protocol information using a BSPM. At step 2002 the MS receives the BSPM from the CS. The BSPM is as described hereinabove. The MS extracts the SO number from the BSPM at step 2004. The SO number is mapped to a set of parameters and protocols sufficient for the MS to receive the desired broadcast. The MS then initiates the protocol stack corresponding to the selected SO number at step 2008. Once the protocol stack is initiated, the MS is able to receive and decode information received on the broadcast channel at step 2010. Note that the BSPM is transmitted on a separate Walsh channel known to the subscribers.

Figure 19:
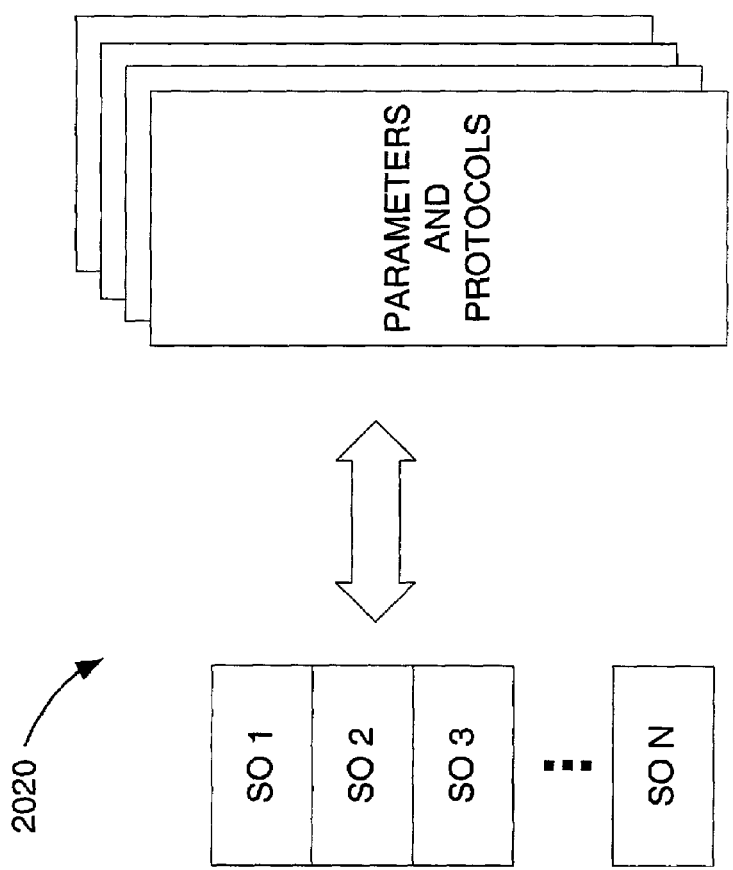
FIG. 19 is a mapping of service option numbers to parameter sets.

FIG. 19 illustrates a mapping 2020 of each of the SO numbers to a set of parameters and protocols. When the CS initially schedules a broadcast, such as soccer match on a given day, the CS determines the parameters and protocols to be used for transmission of the broadcast from a set of previously standardized options.

In one embodiment, the SO number corresponds to a fixed set of protocols and parameters, wherein the mapping is known at the CS and at the MS. The a priori knowledge of the mapping avoids the need to transmit the information, and thus reduces the transmission overhead, i.e., conserves bandwidth. The mappings are stored at the MS, and therefore are not readily changed or updated. If the CS is to use a combination of parameters that have not been previously standardized as a SO number, the standards organization must define a new profile of parameters before this combination of parameters can be used for the broadcast.

Figure 20:
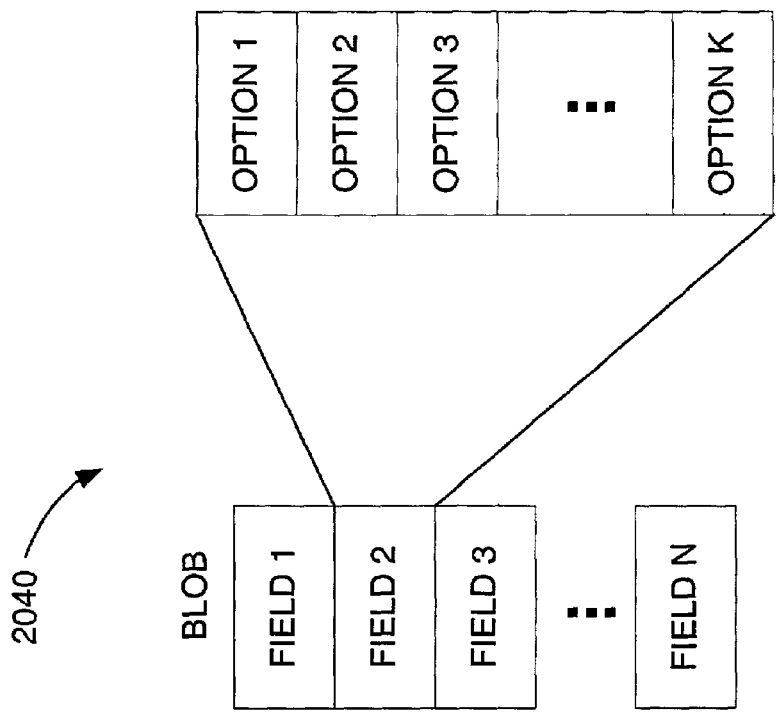
FIG. 20 illustrates parameter definition in a wireless communication system.

The use of a BLOB of information is illustrated in FIG. 20, wherein a broadcast session is assigned a set of parameters. Each parameter may be one of multiple options. The transmission of the parameters provides a level of flexibility in comparison to the use of fixed sets of parameters associated with a SO number. The CS may select any of the available options, and transmits the information to the MS. As illustrated, the FIELD 2 of the BLOB may be specified as any of the options: OPTION 1 to OPTION K, wherein each field of the BLOB may have a different number of available options.

An alternate embodiment provides the broadcast protocols and parameters via out-of-band signaling in the broadcast stream. In the present discussion, out-of-band indicates a separate channel used for communication of the overhead information. The separate channel may be a different frequency or may be a spread-spectrum channel, such as a channel defined by a different Walsh code. The system provides the broadcast parameter and protocol information to the subscriber when the subscriber initiates a packet data call. The subscriber or MS first requests header compression information from the PDSN. Using the information received from the PDSN, the MS is able to receive the broadcast overhead information. The MS contacts the CS via IP type protocols, e.g., RTSP or SIP, to receive a description of the transport and application layers. The MS uses this information to receive, decode and process a broadcast session.

Figure 21:
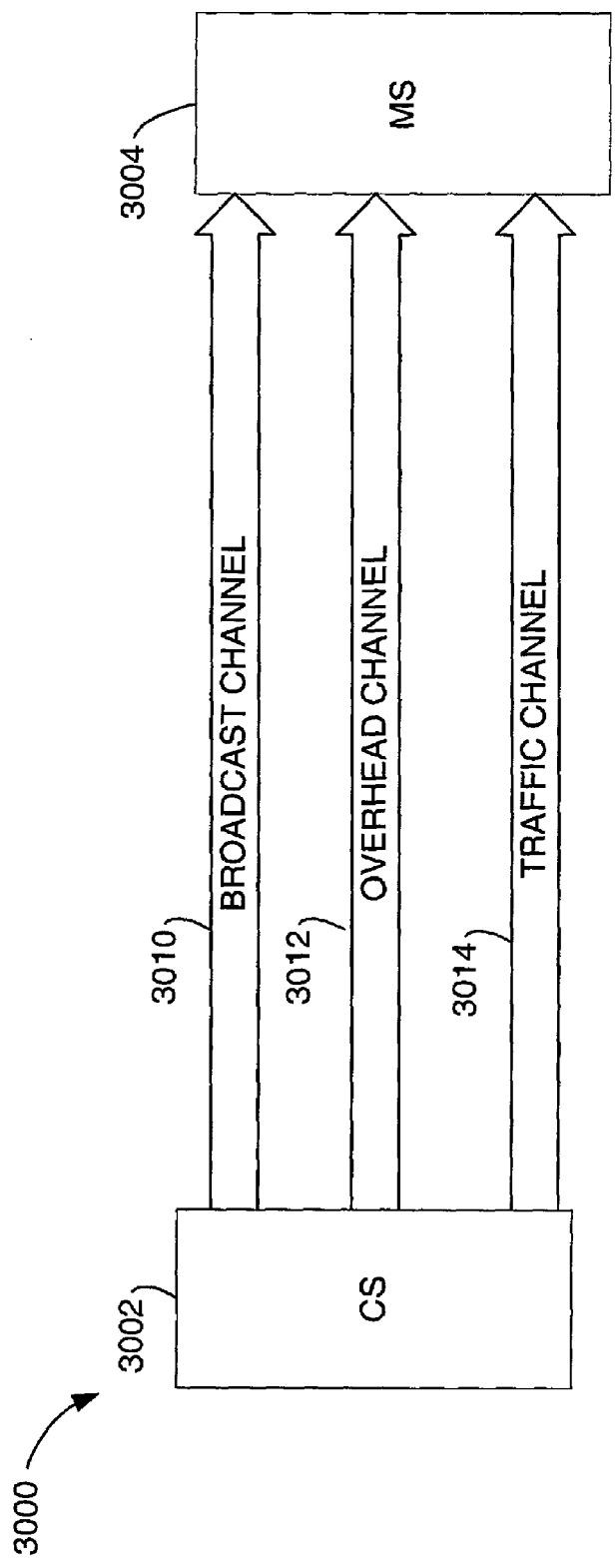
FIG. 21 is a block diagram of channels used for a wireless communication system supporting broadcast services.

FIG. 21 illustrates the various channels used for transmission of various information in a broadcast system. As illustrated the system 3000 includes a CS 3002 and a MS 3004, communicating via a broadcast channel 3010, an overhead channel 3012, and a traffic channel 3014. Broadcast content of a given broadcast session is transmitted on the broadcast channel 3010, which may be a uniquely assigned frequency or may be a uniquely assigned Walsh channel. Transmission of a BSPM message is provided on the overhead channel 3012. The traffic channel 3014 is used for transmission of the out-of-band signaling, such as communication between CS and MS, and communications between PDSN (not shown) and MS.

The MS is able to contact the CS and PDSN directly using the out-of-band signaling over a packet data service option. The out-of-band communication allows the CS to update the information without transmitting via the BS, as the out-of-band communication is directly between the MS and the PDSN or the MS and the CS. Note that when using the packet data service as the out-of-band means, the communication between the MS and CS still passes through the BS. However, the BS does not require knowledge of the payload, thus making it unnecessary to coordinate the CS and BS protocols.

To avoid the disadvantages of the out-of-band methods of transmitting the protocols and parameters to the receivers, the SDP description from the CS can be multiplexed into the broadcast stream. This allows the mobile station to determine the protocol options used by the CS without setting up a packet data call.

The SDP description is sent as frequently as a short-term encryption key (SK) in the broadcast stream. The rate of sending these updates will be limited by the amount of bandwidth available for such updates. For example, if the SDP description is 300 bytes in size and sent every 3 seconds, the required bandwidth is 800 bps. Note that since the SDP description originates from the content server, the content server can improve the media quality by multiplexing the SDP message into the broadcast stream when the media bandwidth is low enough to accommodate it. Effectively the SDP information may be adaptively based on bandwidth conditions. Therefore, as the channel condition and or stresses on the bandwidth of the system change, the frequency of SDP transmission may change also. Similarly, it may be possible to change the size of the SDP by adjusting the information contained therein specific to a given system.

The SDP description is typically transported in RTSP, SAP, or SIP messages. To avoid the overhead of such protocols, it is recommended that the SDP description be transported directly over UDP by identifying a well-known UDP port number to carry the SDP message. This port number must not be used to carry RTP or other types of UDP traffic sent over the broadcast channel. The UDP checksum will provide error detection for the SDP payload.

Figure 22:
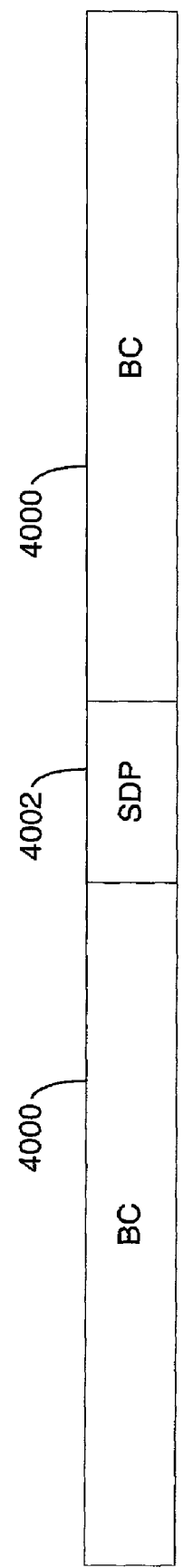
FIG. 22 is a broadcast stream with overhead information interleaved with broadcast content.

According to one embodiment illustrated in FIG. 22, the system provides the broadcast protocols and parameters via in-band signaling in the broadcast stream. The broadcast stream 4000 contains the broadcast content and is transmitted on the broadcast channel, such as broadcast channel 3010 of FIG. 21. Interspersed throughout the broadcast stream 4000 is SDP 4002.

Figure 23:
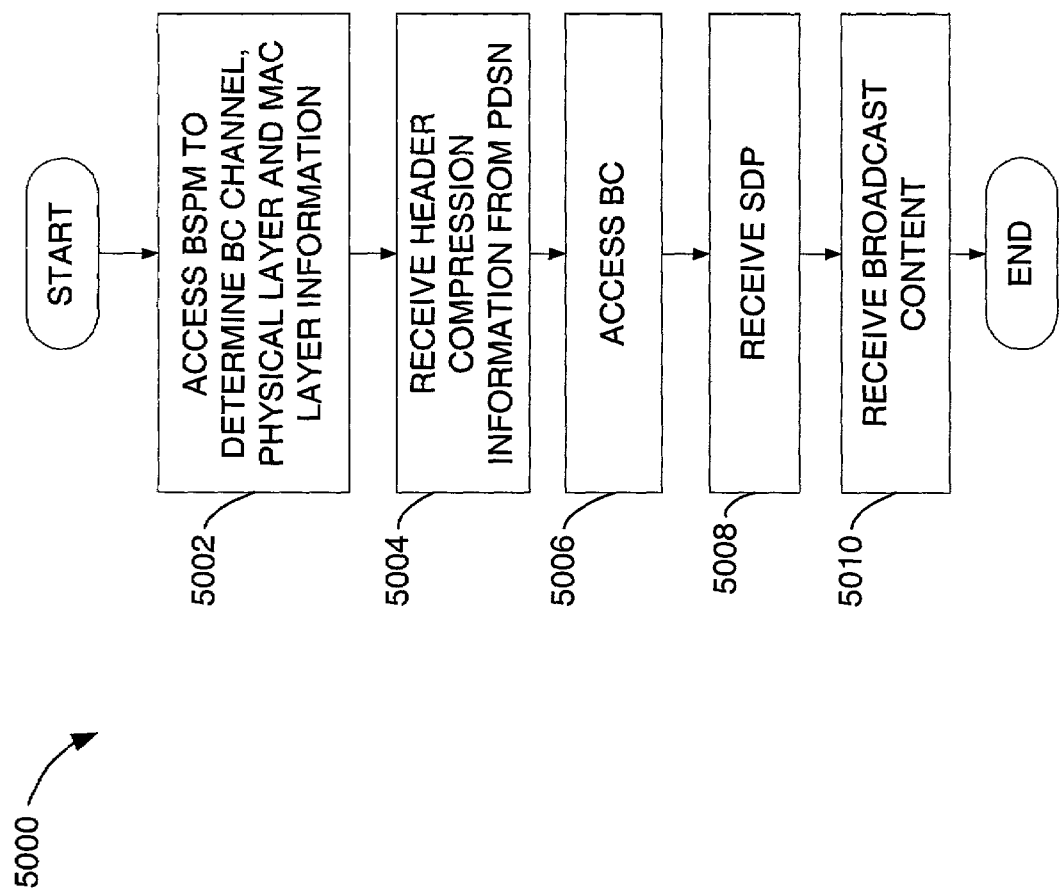
FIG. 23 is a method for accessing a broadcast service in a wireless communication system.
Figure 24:
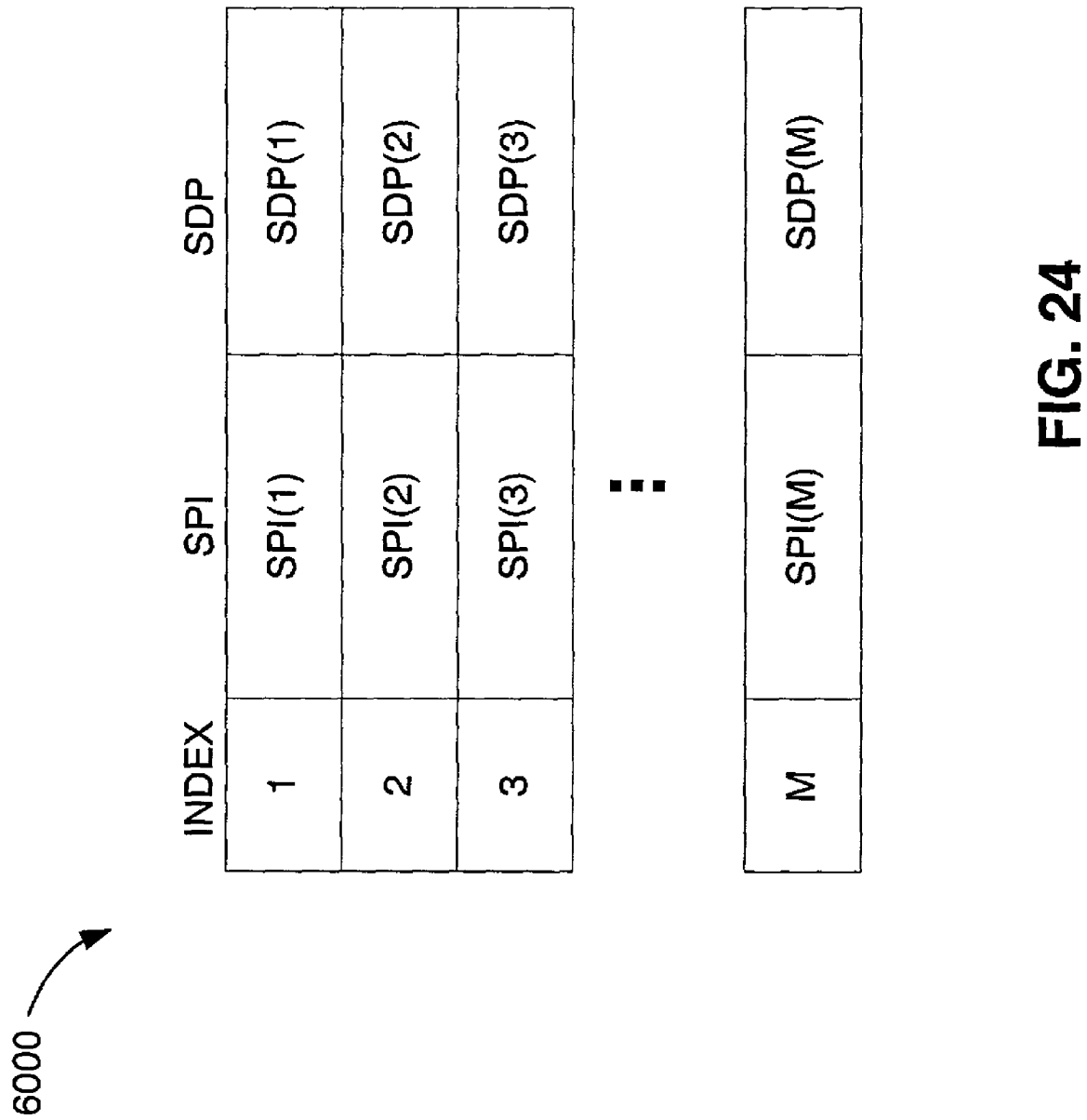
FIG. 24 is a memory element for storing broadcast overhead information.

FIG. 23 illustrates a method 5000 of providing broadcast service parameter and protocol information using an in-band method, wherein the overhead type information is provided with the broadcast content on the broadcast channel. The term in-band is intended to indicate that overhead type information is provided on the same channel as the broadcast content and thus does not require a separate transmission mechanism, i.e., channel. The method 5000 first accesses the BPSM at step 5002. The MS extracts the broadcast channel information, the physical layer information, and the MAC layer information from the BSPM. Header compression information is received directly from the PDSN at step 5004. This can be done by either having the MS directly contact the PDSN via a packet data service option (out-of-band) or by having the PDSN insert the header compression configuration information into the broadcast stream to the MS. At step 5006 the MS accesses the Broadcast Content (BC). In response to receipt of the header compression information, the MS is able to receive the SDP transmitted on the broadcast channel with the broadcast content at step 5008. The SDP contains parameters and protocols for receiving the associated broadcast session. The MS applies the information contained in the SDP to receive, decode, and process broadcast content received on the broadcast channel.

When a subscriber to the broadcast service desires to change to another broadcast session, the set-up and/or initiation of the new broadcast session may introduce unacceptable delays to the subscriber. One embodiment provides a memory storage unit at the receiver, wherein at least a portion of the information is stored at the receiver and may be used to quickly change from one broadcast session, i.e., program, to another, or alternately, may be used to recall a previously accessed broadcast session. FIG. 23 illustrates a memory storage 6000 that stores the SPI and SDP corresponding to each broadcast session accessed. The overhead information corresponding to a current broadcast session is stored in memory 6000, wherein the stored information is the last received information. In one embodiment, the memory storage 6000 is a First In First Out (FIFO) memory storage unit. In an alternate embodiment, a cache memory is used. In still another embodiment, a Look Up Table (LUT) stores information relating to accessed broadcast sessions.

In embodiments using mechanisms such as cache memory and/or LUT, the MS uses a simple time-stamp algorithm to maintain only one copy of the most recent SPI-SDP configurations in memory. For each SPI-SDP pair, the MS maintains a time stamp of when the MS received the description last. If the MS detects an SPI that already exists in its memory, it uses the stored configuration and updates the time stamp to the present time. If the detected SPI is not in the MSs memory, the MS replaces the oldest SPI-SDP entry in its memory with the newly detected SPI-SDP pair. The MS now uses this new configuration to decode the broadcast stream.

Session Description Identifier

In one embodiment, a broadcast system provides that protocol options for the application and transport layers are controlled directly by the Content Server (CS). Providing control at the CS avoids complexities and overhead processing and transmission for coordination of the protocols with the wireless infrastructure network, such as the BSC, BTS, and/or PDSN. When protocol options are changed, the mobile station is notified. In response, the MS determines the parameters required to decode the new content formats. As the MS receives new broadcast content on the broadcast transmission stream, the changed or updated parameters, i.e., parameters specified by the changed or updated protocol options are used to decode the incoming stream. There are a variety of methods for providing this information to the MS and/or other receiver.

According to one embodiment, the CS periodically multiplexes the session description of the protocol options (i.e., SDP) into the content stream. As discussed hereinabove, the SDP provides sufficient information for the MS to decode the formats of future broadcast content payload transmitted in the broadcast stream. The SDP is sent repeatedly to accommodate mobile stations that tune into the stream later and have not retrieved any earlier broadcasts of the protocol descriptions.

FIG. 25A illustrates, in timing diagram form, the CS periodically multiplexing the SDP of the protocol options into the broadcast transmission stream. As illustrated, at time tx the transmission stream includes content packets that are encoded and processed using a set of protocol options identified by index "x." The protocol options for set x are described in SDPx which is transmitted periodically in the broadcast transmission stream. The SDPx is transmitted from time tx to time ty. During this time, the multiplexed content packets are encoded and processed using protocol options of set x.

Continuing with FIG. 25A, at time ty the protocol options change and thus a new set of protocol options is identified by index "y." The protocol options for set y are described in SDPy which is transmitted periodically in the broadcast transmission stream. The SDPy is transmitted from time ty to time tz. During this time, the multiplexed content packets are encoded and processed using protocol options of set y. At time tz the protocol options change and thus yet another set of protocol options is identified by index "z." The protocol options for set z are described in SDPz which is transmitted periodically in the broadcast transmission stream. The SDPz is transmitted from time tz to time tf. During this time, the multiplexed content packets are encoded and processed using protocol options of set z. Alternate embodiments may initiate transmission of a new SDPI prior to a change in the content stream, allowing the receiver processing time to adopt the new set of protocol options.

Once the MS receives this description, the MS immediately knows how to decode the formats of any proceeding content payload. The description is sent repeatedly to accommodate mobile stations that tune into the stream later and have not retrieved any earlier broadcasts of the protocol descriptions. FIG. 25B illustrates the received signal at the MS or other receiver, wherein the broadcast transmission stream includes the multiplexed SDP or other session description information. At time t1 the MS tunes into a broadcast channel to receive a broadcast transmission. The MS then waits to receive the session description information, i.e., SDP. At time t2 the MS receives the SDPy describing protocol option set y. The MS uses the description defined by the protocol option set y to decode the content encoded and processed according to set y, wherein such content is transmitted subsequent to transmission of the SDPy. At time t3 the MS begins to receive SDPz describing protocol option set z. At time t4 the SDPz has been received and the MS uses the description defined thereby to decode the content encoded and processed according to set z.

According to another embodiment, to reduce the transmission of the information contained in the SDP, i.e., description of the protocol options for a current or upcoming transmission, each SDP is given an identifier. The identifier is referred to as a broadcast session description identifier and is identified as the "SDP_ID." The system then periodically multiplexes the broadcast session description identifier (e.g., SDP_ID which is used interchangeably herein) corresponding to a given protocol option description into the content stream. Once the MS receives the SDP_ID, the MS can determine the corresponding protocol description for use in decoding the broadcast stream, i.e., content payload encoded and processed using the corresponding protocol description.

FIG. 26A illustrates, in timing diagram form, the transmission of the SDP_ID in a broadcast transmission stream. As described with respect to FIGS. 25A and 25B, each protocol option set is identified by an index, such as x, y or z. There may be any number of protocol option sets. The SDP_ID corresponds to a protocol option set. As illustrated in FIG. 26A, from time tx to time ty, the CS periodically transmits the SDP_ID corresponding to set x as the content transmitted during that time interval is encoded and processed according to the protocol option set x. According to the embodiment illustrated in FIG. 26A, the CS transmits the SDP_ID, which is designed to be a smaller message than the full description, SDP, and therefore, reduces the overhead transmission for the corresponding broadcast transmission stream. At time ty the CS begins to periodically transmit the SDP_ID corresponding to protocol option set y; and at time tz the CS begins to periodically transmit the SDP_ID corresponding to protocol option set z.

Upon receipt of the SDP_ID, the MS determines if the corresponding description is stored or accessed locally. If the MS does not have the protocol description corresponding to the description ID, the MS halts decoding and processing to avoid using incompatible protocol options which may result in displaying unintelligible content to the user. The MS contacts the CS to retrieve the protocol description identified by the SDP_ID. (Note that the MS may contact the CS ahead of receiving the content having the new protocol description, and thus avoid a blackout period.) In this way the CS only sends the entire protocol description on a need-to-know basis. Effectively, the CS sends the entire description periodically in the content stream, a process which consumes significant bandwidth. Note that sending the full description is typically sending redundant information, as after the first transmission, most mobile stations have stored the description. Therefore, sending a SDP_ID uses much less bandwidth, as an ID is typically a small number of bits, such as one byte. Additionally, transmission of a small message (i.e., SDP_ID) rather than the corresponding longer message (SDP) is less prone to errors and has a higher probability of correct reception.

FIG. 26B illustrates receipt of the SDP_ID at the MS or other receiver. As illustrated, at time t1 the MS tunes to the broadcast channel and waits for a next SDP_ID. During this time, the MS displays no content. Alternate embodiments may display a message or a stored content that will fill time until the transmission is ready. At time t2 the MS receives the current SDP_ID for protocol option set y. From this point, the MS applies the set y to decoding and processing received broadcast transmission content. At this point, if the MS does not have local access to the protocol options description corresponding to the received SDP_ID, the MS requests this information from the CS. The delay time to request the information and wait for receipt may introduce a blackout period for the MS. During this time, the MS may be programmed to fill the blackout time with information, such as advertising. From time t2 to time t3 the MS decodes the broadcast content using the set y. At time t4 the MS has received a new SDP_ID for set z. Again, either the MS has local access to the corresponding protocol options description or requests the information from the CS. Once the MS has the corresponding set z descriptions, the MS decodes and processes the broadcast content.

Figure 26C:
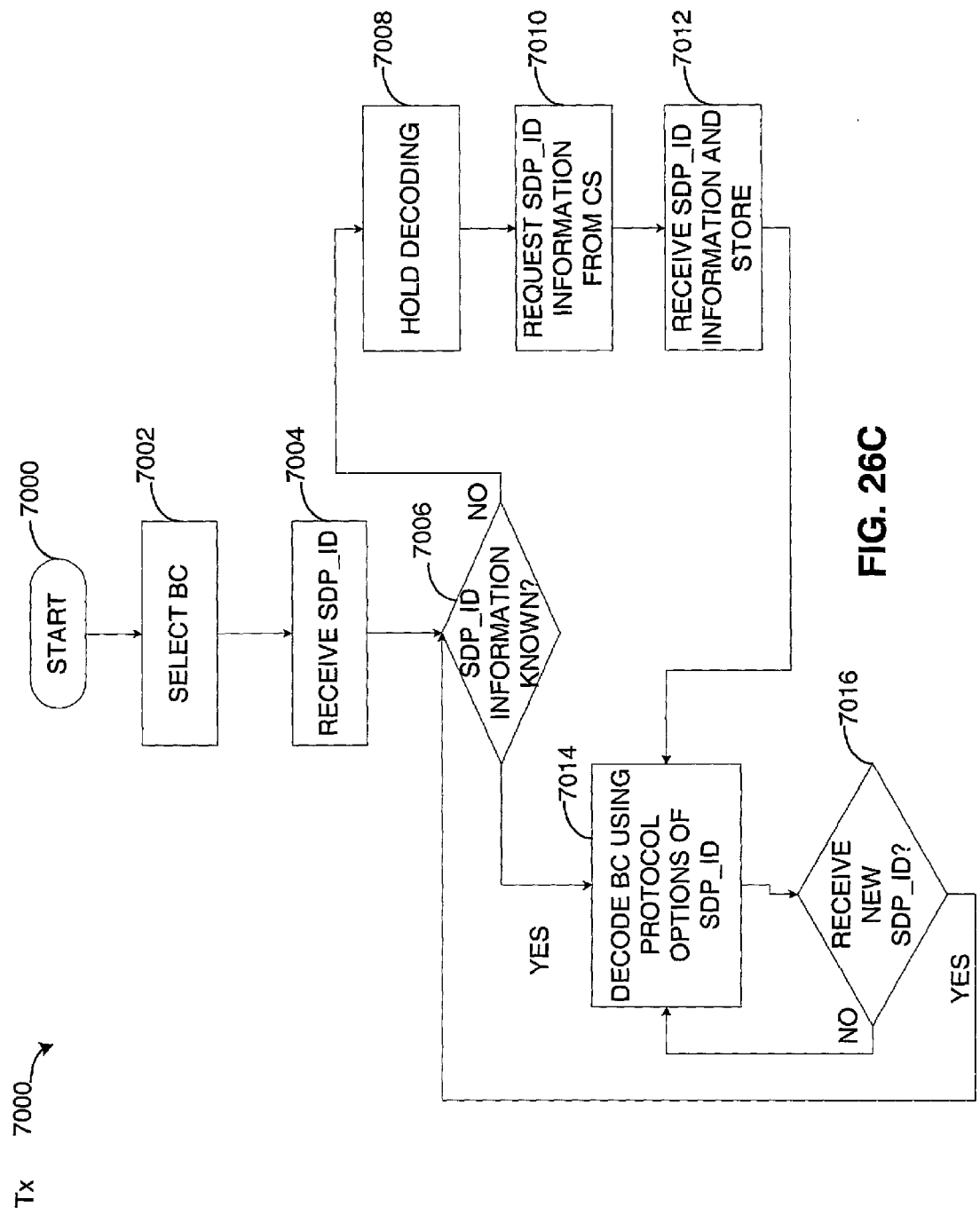
FIG. 26C is a flow diagram of receipt and handling of a broadcast stream at a receiver.

FIG. 26C illustrates the process of receiving the broadcast stream at a receiver according to one embodiment. The process 7000 starts when the MS selects a broadcast to receive at step 7002. At step 7004 the MS receives the SDP_ID. If the SDP_ID is known at decision diamond 7006, the processing continues to step 7014 to decode the BC content using the protocol options set defined by the SDP_ID. The decoding continues until a new or updated SDP_ID is detected at decision diamond 7016, whereupon processing returns to step 7006. If the MS does not have information regarding the SDP_ID at decision diamond 7006, processing continues to step 7008 to halt decoding. At step 7010 the MS requests the SDP_ID description information from the CS. At step 7012 the MS receives the SDP_ID information from the CS, stores the information locally and proceeds to step 7014.

As described hereinabove, once the MS receives the description ID, the MS is able to determine which protocol description to use for decoding the formats of corresponding content payload. The MS may store copies of the SDP_ID and corresponding protocol options sets, or may access the information locally, such as where such information is stored at the BS. If the MS does not have the protocol description corresponding to the description ID, the MS stops decoding the content to avoid displaying unintelligible content to the user. At the same time, the MS contacts the content server (CS) to retrieve the necessary protocol description identified by the SDP_ID.

When sending the description ID, the CS can also send information indicating the length of time during which the SDP_ID will maintain the associated description. This information is referred to as the lifetime of the current description. Additionally, the CS may determine to send the SDP_ID of the next session or multiple sequential sessions. Therefore, the information transmitted may include a current SDP_ID or "CURRENT_DESC_ID," a current SDP_ID lifetime or "CURRENT_DESC_LIFE," and/or a next SDP_ID or "NEXT_DESC_ID." The lifetime parameter (CURRENT_DESC_LIFE) effectively tells the MS until when the current description will be valid. This provides the MS an indication of when to retrieve the next description (NEXT_DESC_ID). To avoid service interruption, the MS can retrieve the next description before the protocol options change.

There are several approaches to multiplexing the SDP_ID into the broadcast transmission stream. Two methods are provided as exemplars. In a first method, between a predetermined number of content packets, the CS inserts a SDP_ID packet, such as illustrated in FIGS. 26A and 26B. The SDP_IP packet may be distinguished from the content packets by using a pre-selected UDP port number that is different from that used by the content; or the SDP_IP packet may be distinguished by using a pre-selected destination IP address that is different from that used by the content.

Figure 26D:
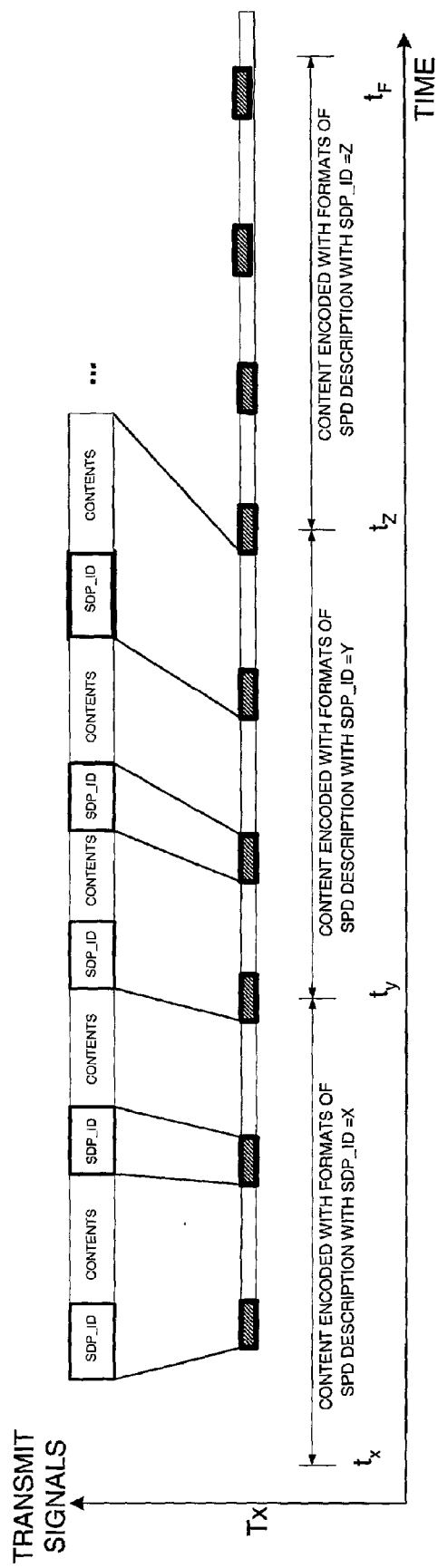
FIG. 26D is a timing diagram of transmission of broadcast overhead information identifiers multiplexed with broadcast packets in a broadcast stream in a wireless communication system.
Figure 26E:
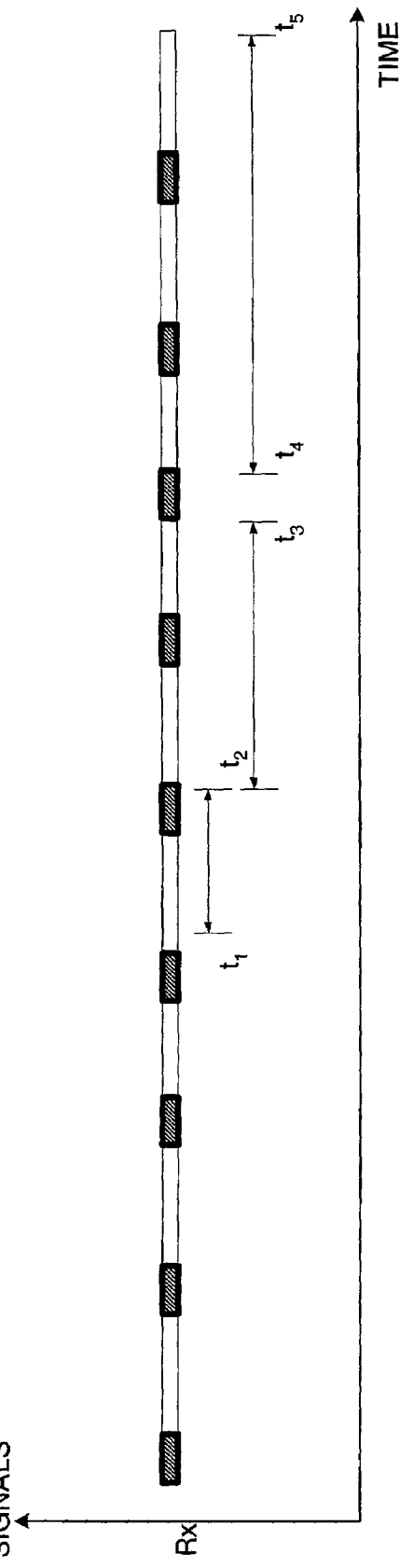
FIG. 26E is a timing diagram of a received broadcast transmission stream including broadcast overhead information identifiers multiplexed with broadcast packets.

According to another method of multiplexing, in each content packet, the CS inserts an SDP_ID field. For example, the SDP_ID field may be inserted in the IP payload just before the content payload (e.g., before the UDP header). This informs the MS of the protocol description corresponding to each packet. The MS does not have to wait for the description ID packet to determine how to decode the content formats. The blackout period is thus reduced to less than the duration of one content packet. This method is illustrated in FIGS. 26D and 26E, wherein the SDP_ID is inserted in each content packet. The MS receives the SDP_ID concurrently with receipt of the content packet.

As illustrated in FIG. 26D, the content is encoded and processed with protocol options set x from time tx to time ty, and with set y from time ty to time tz, etc. At the receiver, as illustrated in FIG. 26E, the MS tunes into the broadcast channel at time t1, and waits for the next content packet which contains the SDP_ID. When the MS receives the SDP_ID, the MS applies the corresponding description to decoding and processing the content packet. Note that if the MS does not have the corresponding description, the MS must access the information which may introduce a blackout time. Similarly, at time t4 the MS has received the SDP_ID of set z. The MS then starts decoding the content packet using set z.

Still another embodiment employs a combination of the methods illustrated in FIGS. 25 and 26. According to this embodiment, when the protocol options are about to change, the CS sends the full description of the new protocols to be used. This allows all mobile stations currently tuned in to the stream to receive the description at approximately the same time, and therefore individual receivers are not required to retrieve the information individually. After the protocol options have changed, the CS stops sending the full description and sends the SDP_ID corresponding to the next description instead. Mobile stations which tune into the stream at a later time are able to detect that a new set of protocol options are being used, indicating the MS should retrieve the new protocol options directly from the CS.

FIG. 27A illustrates transmission of the SDP description on an SDP change. As illustrated, during the time interval ty to tz the CS periodically transmits the SDP_ID, wherein prior to a change from protocol options set y to set z, the CS sends the full SDP for set z. Just prior to time tz the CS sends the full SDP for set z. Along with the SDP for set z, the CS may also send the current SDP_ID (for set y) and the current SDP_ID lifetime. In this way, the MS is informed of when the change will occur. The CS also transmits the next SDP_ID (for set z) along with the description of set z sufficient to allow processing of set z encoded and processed content. Just after time tz the CS begins to send the SDP_ID for set z. Note that alternate embodiments may transmit the SDP description multiple times allowing user tuning into the broadcast channel soon after a change to also receive the description information.

At the receiver, illustrated in FIG. 27B, the MS tunes to the broadcast channel at time t1 and waits for the next SDP_ID. At time t2 the MS receives the SDP_ID corresponding to set y and may begin decoding using the protocol options so designated. At time tc, between time t2 and t3, the MS receives a change of SDP identified by the SDP_ID of set z, along with the SDP description for set z. Receipt of the set z information prior to receipt of any set z encoded and processed content packets allows the MS to avoid a blackout period for changing these parameters. At time t4 the MS begins receiving the set z content packets and decodes them accordingly.

According to one embodiment, the CS delivers the protocol description to all the mobile stations listening to the channel before the protocol change. Therefore it is expected that the majority of mobile stations that require this description will receive the description early. Sending the description in this manner conserves bandwidth, reducing the number of times individual MSs retrieve these descriptions from the CS. Additionally, the mobile stations from avoid interruptions in decoding the broadcast stream which often result in a viewing blackout. Additionally, the present embodiment provides dynamic updates to the description with little to no disturbance to the user. Note also, that provision of the description each time reduces the desire to store the SDP descriptions at the MS, thus reducing memory requirements of the wireless apparatus.

For any additional mobile stations that tune in at a later to the stream, the SDP_ID indicates the MS should retrieve the description individually. As the "late tuners" is typically a smaller group of mobile stations, the individual requests incurred will typically not impact the bandwidth use. Similarly, the CS is able to conserve broadcast bandwidth as the periodic transmission of the entire description over the broadcast stream is avoided.

The information transmitted by the CS may include a variety of different information as described in the various embodiments provided hereinabove. The SDP may be transmitted as a Protocol Data Unit (PDU), including multiple predefined fields. The format of the PDU may be given as illustrated in FIG. 28. The length of the fields are given according to one embodiment, but may be varied according to the design goals and constraints of a given system. The fields include a CONTOL field to identify the format of the PDU containing the SPD. The CONTROL field further indicates whether the next SDP_ID field or NEXT_SDP_ID, the included SPD description identifier field or INCL_SDP_DESC_ID, and the included SDP description field or INCL_SDP_DESC, are included in the PDU. The PDU further includes a current SDP identifier or CURRENT_SDP_ID to identify the currently active SDP description, i.e., the description currently being used for encoding and processing the content. The current SDP lifetime, described hereinabove, is transmitted in a field CURRENT_SDP_LIFE that indicates until when the current SDP is valid. The CURRENT_SDP_LIFE information provides the MS an indication of when to start retrieving the SDP description for the next session, which is indicated by the NEXT_SDP_ID field. The NEXT_SDP_ID field is an identifier of the SDP description for the next session. The MS may use this ID to retrieve the SDP description of the next session before the next session starts. The MS may then avoid blackout time when the MS is able to retrieve the SDP description while decoding the broadcast stream or while the user has stopped viewing the broadcast service.

Additionally included in the PDU are the INCL_SDP_DESC_ID and the INCL_SDP_DESC. The INCL_SDP_DESC_ID is an identifier for the SDP description that may be included in the PDU. Note that the INCL_SDP_DESC may for the current description, the next session, or for a future session(s). Sending future sessions allows the MS to store these descriptions for viewing the future content without retrieving the description directly from the server. The INCL_SDP_DESC indicates the SDP description for a particular session. Sending this on the broadcast can prevent MSs from having to individually retrieve the SDP description from the content server. However, since this increases the transmission bandwidth, it is recommended that this be sent prior to and just after the session parameters have changed (i.e., at the boundary between two sessions).

FIG. 29A illustrates transmission of an SDP including at least one of the fields of FIG. 28. Specifically, the CS transmits the CURRENT_SDP_ID, the CURRENT_SDP_LIFE, and the NEXT_SDP_ID. During the time interval from time tx to time ty, just prior to the change to set y, the CS transmits and SDP including the CURRENT_SDP_ID for set x, the CURRENT_SDP_LIFE for set x, and the NEXT_SDP_ID for set y. Similarly, just after the change to set y at time ty, the CS sends an SDP including the CURRENT_SDP_ID for set y, the CURRENT_SDP_LIFE for set y, and the NEXT_SD- P_ID for set z. The early transmission of change information provides time for the MS to adjust and avoid incurring blackout time.

At the receiver, illustrated in FIG. 29B, the MS tunes into the broadcast channel at time t1 and waits for the SDP_ID. At time tc, just prior to changing from set y to set z, the MS receives the CURRENT_SDP_ID for set y, the CURRENT_SDP_LIFE for set y, and the NEXT_SDP_ID for set z. The MS prepares to decode content packets of set z prior to receipt.

Where the SPD includes information used for preparing for future receipt of content packets, the SDP_ID and content packets are to be received in the same order as of transmission from the CS. The Internet Protocol (IP) used on the general Internet does not guarantee in-order delivery of IP packets. Problems may result when a content packet is received incorrectly after the SDP_ID for the new session has been received. To prevent incorrect or inconsistent ordering of the content packets and/or the SDP_ID PDUs in the IP transmission, one embodiment implements an IP Generic Routing Encapsulation (GRE) packet or GRE tunnel between the PDSN and content server. The GRE tunnel encapsulates the PDU and effects a different addressing. The GRE tunnel assigns sequence numbers to the IP payload packets and allows the PDSN to reconstruct received packets in order before sending them over the broadcast channel (e.g., through the PCF/BSC).

Figure 30:
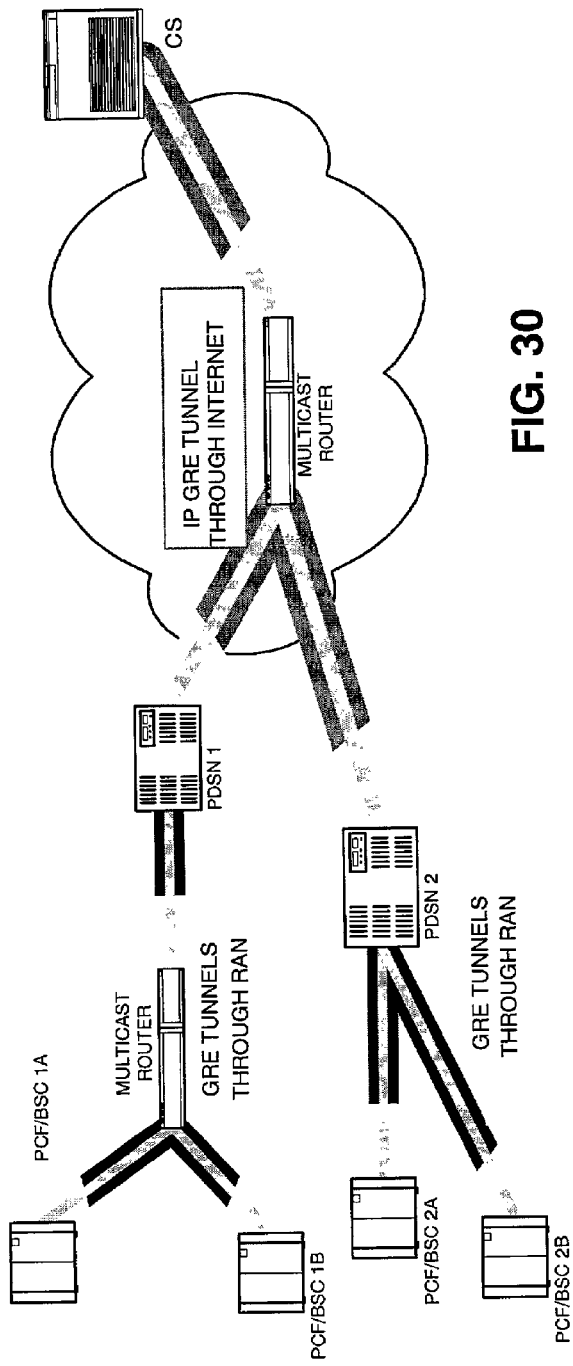
FIG. 30 is a wireless communication system supporting broadcast transmissions.
Figure 31:
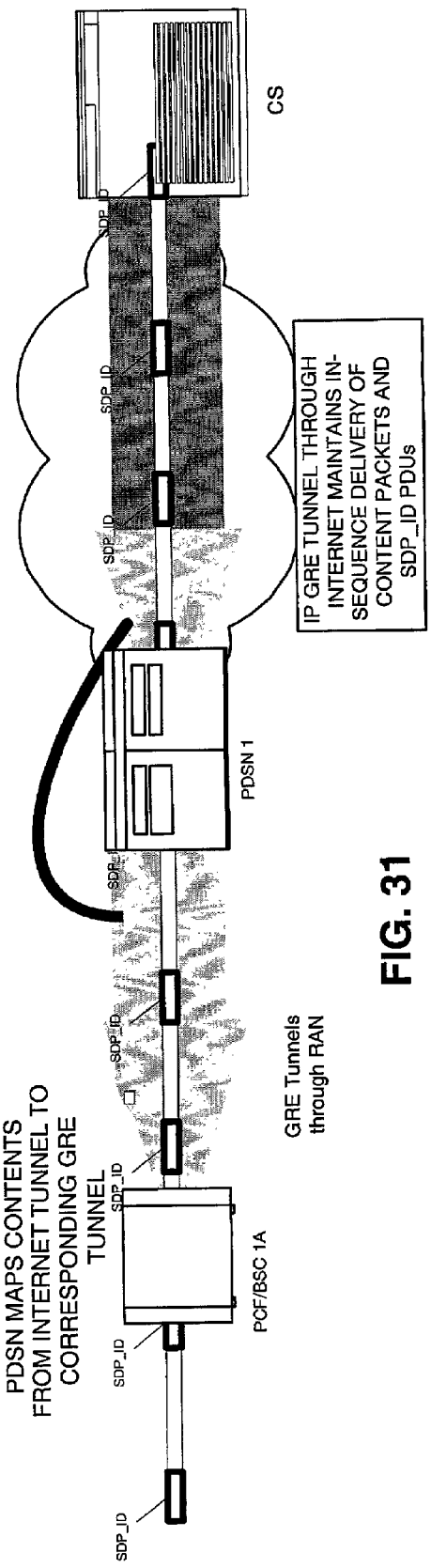
FIG. 31 is a wireless communication system supporting broadcast transmissions.

FIGS. 30 and 31 illustrate routing of a PDU through a wireless communication system 8000. The system 8000 includes a CS 8002 coupled to PDSNs 8006, 8008 via an Internet connection 8004. The Internet connection 8004 is basically a configuration of interconnected routers that form an IP path from the CS to various recipients of data from the CS. In the IP cloud 8004 a virtual tunnel is formed for transmitting information. In one embodiment, the tunnel is a GRE tunnel. Alternate embodiments may implement any of a variety of tunneling methods that provide in-sequence receipt of IP packets.

The PDSNs 8006 and 8008 may then map the received content packets to virtual tunnels to individual PCF or BSC receivers in the Radio Access Network (RAN), such as units 8010, 8012, 8014, and 8016. The virtual tunnels from the PDSNs 8006 and 8008 may be multicast tunnels, such as from PDSN 8006, or may be unicast tunnels, such as from PDSN 8008.

The multicast tunnel from PDSN 8006 is further detailed in FIG. 31, wherein the CS 8002 transmits the broadcast transmission stream having SDP_ID multiplexed with content. The broadcast transmission stream is transmitted via cloud 8004 encapsulated according to the GRE protocol to form a GRE tunnel. The PDSN 8006 then maps the received stream to a corresponding multicast GRE tunnel. The use of a GRE protocol provides a sequence number to packets in the stream and allows the reconstruction of the original information in order.

Message Flow

Figure 5:
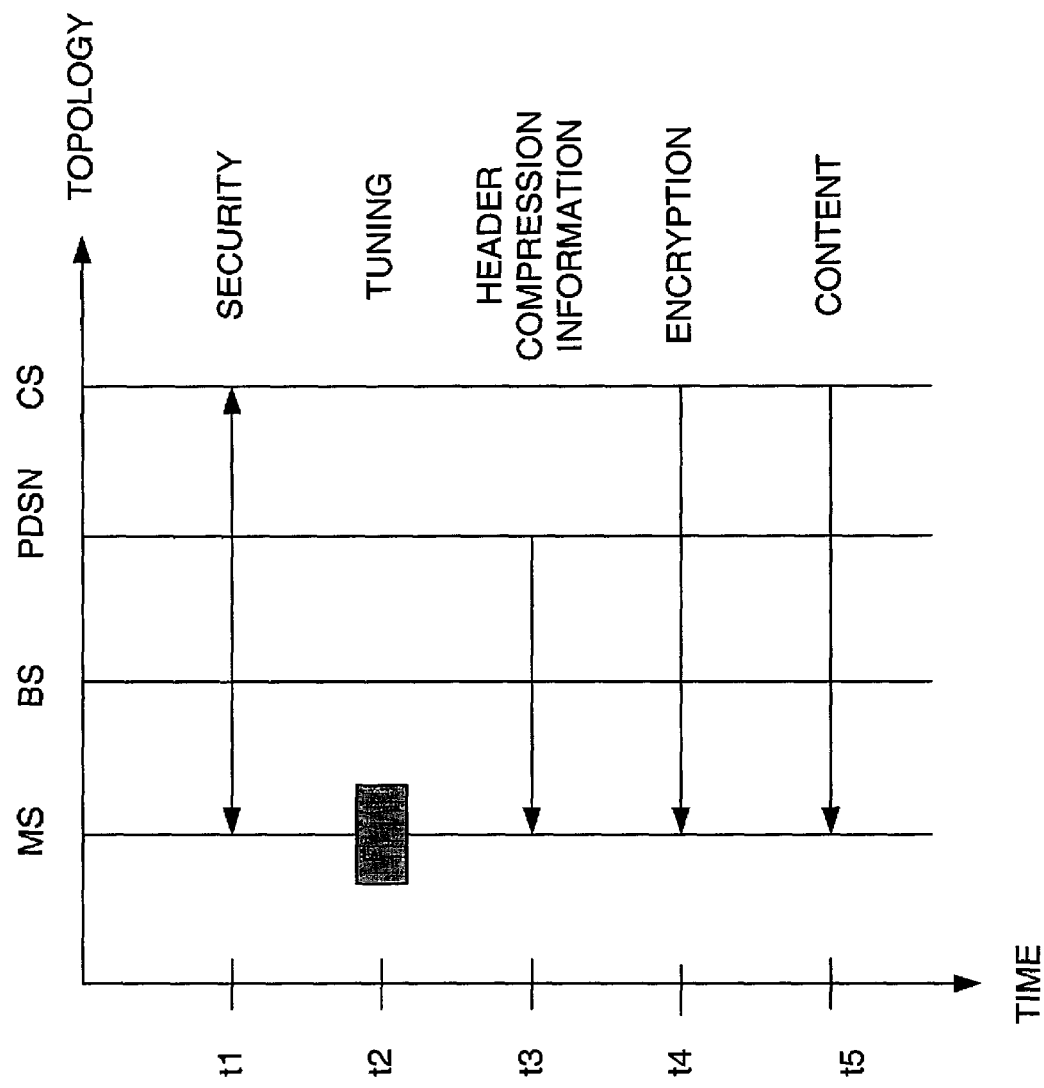
FIG. 5 is a flow diagram for accessing a broadcast service in a wireless communication system topology.
Figure 6:
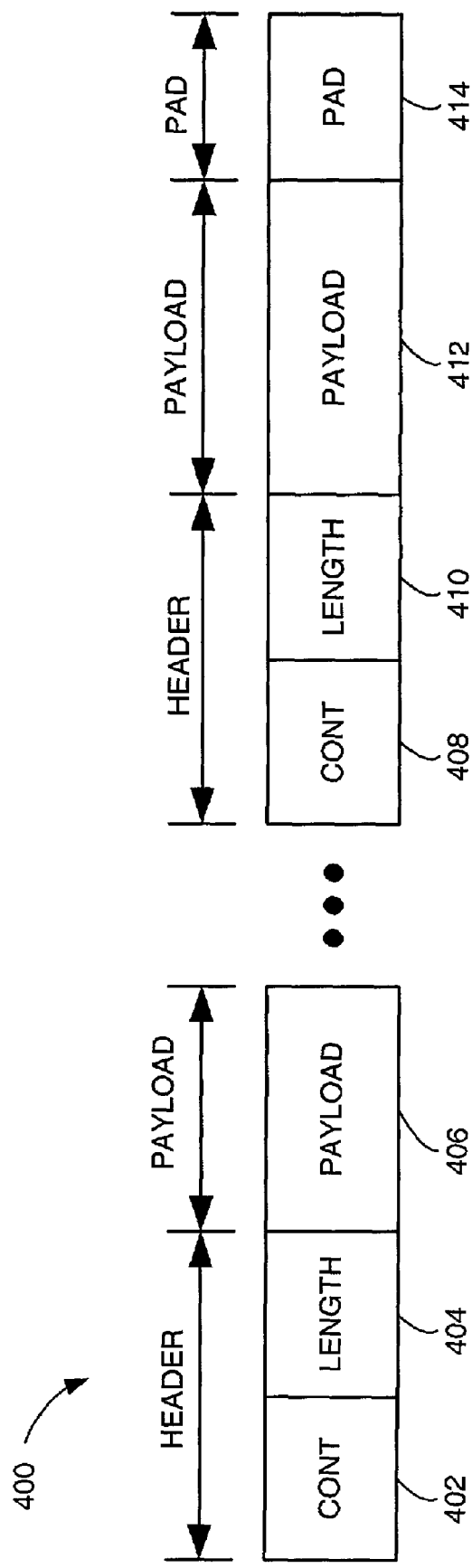
FIG. 6 is a broadcast stream in a wireless communication system.

FIG. 5 illustrates the call flow for accessing a broadcast session in the exemplary embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to the exemplary embodiment, the CS provides the encryption information over a dedicated channel during a packet data session, such as via PPP, WAP, or other out-of-band methods.

At time t2 the MS tunes into the broadcast channel and starts to receive packets. At this point in time, the MS is enabled to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Compression

According to the exemplary embodiment, broadcast content is transmitted on a dedicated broadcast channel. The transport layer provides encryption overhead for carrying broadcast content in IP packets. The system supports data compression, and specifically header compression. The decision to compress data depends on the required average throughput (including transport/encryption overhead, data link layer overhead, and physical layer overhead) and user perception of the broadcast quality. Carrying more broadcast content in each IP packet reduces overhead and thus reduces the broadcast channel bandwidth. In contrast, compression increases the Packet Error Rate (PER) that affects user perception. This is due to the transmission of each long IP packet spanning multiple physical layer frames and thus is associated with increases in the Frame Error Rate (FER). If a carrier decides to use small IP packets to improve broadcast quality, the carrier may choose header compression to reduce the transport and encryption overhead of the IP packet.

The RTP/UDP/IP protocols are used to transport broadcast content from the CS to MS, and the content is protected by the ESP in transport mode. The transport overhead is the RTP/UDP/IP header and is 40 bytes per IP packet data. The encryption overhead is in the form of ESP header, Initialization Vector (IV), and ESP trailer. The ESP header and IV are inserted between the IP header and UDP header. The ESP header consists of the SPI (4 bytes) and Sequence Number (4 bytes). The length of IV is specific to which encryption algorithm is used. For the AES Cipher Algorithm, the length of IV is 16 byte. The ESP trailer is appended to the end of the UDP datagram and consists of the padding, next header (1 byte), and padding length (1 byte). Since the cipher block size of the AES algorithm is 16 bytes, the padding size ranges from 0 to 15 bytes. Taking the ceiling function of the average padding size yields 8 bytes. For an IP packet the total overhead due to transport and encryption ranges from 66 to 81 bytes with the average of 74 bytes not including the data link layer overhead from the PDSN to the MS.

Header compression such as the Robust Header Compression (ROHC) may be used to reduce the IP header and the SPI field of the ESP Header from 24 bytes to 2 bytes. The Sequence Number of the ESP header is not compressed, because it is used to sequence the compressed packets. The IV is not compressed, because it changes randomly for every packet. The UDP/RTP header and ESP trailer cannot be compressed because they are encrypted. Therefore, if ROHC is used to compress the IP/ESP header, the average overhead due to transport and encryption is reduced from 74 bytes to 52 bytes per IP packet.

Figure 7:
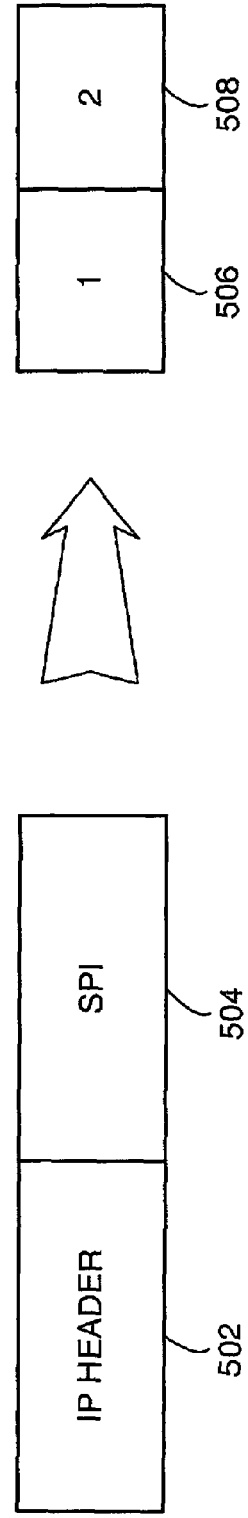
FIG. 7 is a header compression mapping in a wireless communication system.
Figure 8:
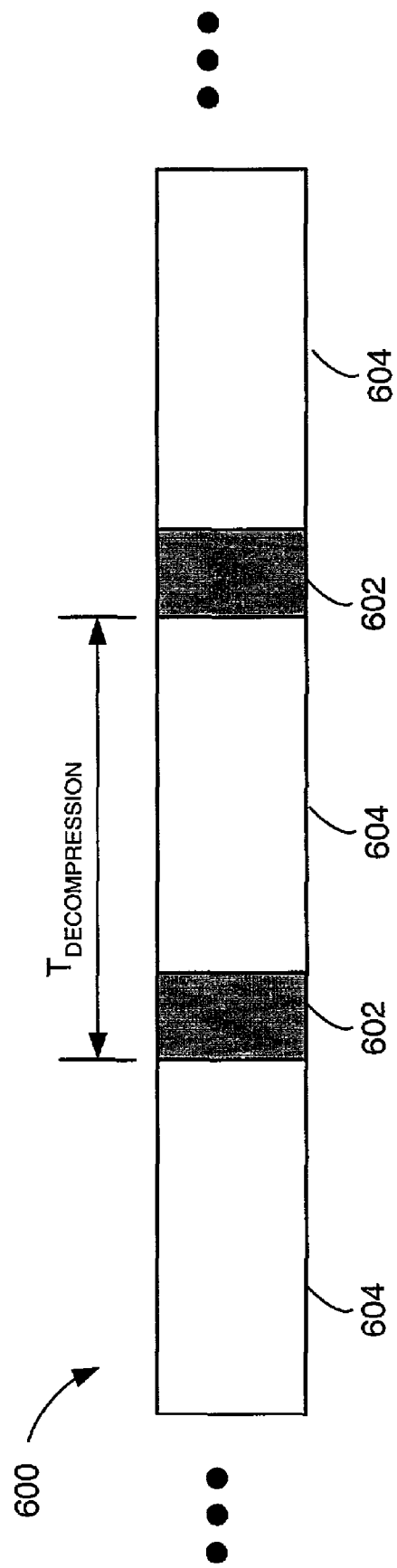
FIG. 8 is a periodic broadcast of header compression information.

According to the exemplary embodiment, header compression, such as the Robust Header Compression (ROHC), is applied so as to avoid propagating decompression errors. As illustrated in FIG. 7, the header information is compressed from 24 bytes down to 2 bytes. The header 500 includes an IP header 502 and a SPI portion 504. The compression algorithm results in a 2-byte result after compression. In contrast to conventional header compression, wherein some type of negotiation is required between the MS and the PDSN or other infrastructure element, the exemplary embodiment provides a uni-directional transmission of compression information. The MS does need to request the compression information, i.e., header compression parameters sufficient for decompression of the received information at the MS. Rather, the PDSN provides the compression information periodically as illustrated in FIG. 8. The PDSN provides the compression information on the broadcast channel interspersed with broadcast content. The provision of control information within a data stream is referred to as "in-band" as a separate channel is not required. As illustrated, the broadcast stream 600 includes broadcast content portions 604 and decompression information, i.e., compression information, 602. The decompression information is provided having a period of $T_{DECOMPRESSION}$. Alternate embodiments may provide the decompression information on occurrence of a predetermined event rather than periodically. As the MS does not request the decompression information, the PDSN supplies the information with a frequency that prevents delays in accessing the broadcast content. In other words, the PDSN should provide the information often, so that an MS may access the broadcast at any time without having to wait for decompression information.

Note that ROHC may be operated in a unidirectional mode, wherein, packets are sent in one direction only: from compressor to decompressor. In this mode, therefore, makes ROHC usable over links wherein a return path from decompressor to compressor is unavailable or undesirable. Before the MS can decompress packets received from the broadcast channel, the state of decompressor is initialized. The Initialization & Refresh (IR) packet is used for this purpose. There are two alternatives for the ROHC initialization.

The subscriber "tunes" to the broadcast channel and waits for the ROHC IR packets periodically sent by the ROHC compressor in the PDSN. Frequent ROHC IR packets may be needed for the MS to start decompressing received packets quickly. Frequent ROHC IR packets may use too much bandwidth in the broadcast channel. An IR packet is about 30 bytes for the IP/ESP compression profile. If an IR packet is sent once every 250 ms., the process consumes about 1 kbps in the broadcast channel. Losing IR packets over the air would further delay the MS to acquire ROHC initialization.

If decompression goes out-of-sync, due to packet loss, or residual error in the received compressed header, or failure, etc., the resultant decompression error may propagate until decompression is re-synchronized or re-initialized. An ROHC compressed header contains a Cyclic Redundant Check (CRC), which is calculated over the entire header before compression. This CRC allows decompression to perform a local context repair that brings the context in sync (in the events of packet loss and residual error). When decompression recovers from a failure, periodic IR packets effectively re-initialize the decompression process.

Transport Layer

A data link layer framing protocol or transport layer protocol is applied between the PDSN and the MS to delineate packets received from the broadcast channel. With reference to FIG. 3, information in the transport layer, identified as LINK LAYER, is provided between the PDSN and the MS. The framing information is generated at the PDSN and is provided to the MS via the BS. The PDSN receives IP streams from the CS and frames the IP streams according to a predetermined framing protocol. As illustrated in the exemplary embodiment, the PDSN applies a framing protocol version of the High-Level Data Link Control (HDLC). The HDLC specified in the ISO standard corresponds to Layer 2 of the International Standards Organization (ISO) 7-layered architecture, wherein Layer 2 is referred to as the Data Link Layer. The HDLC protocol seeks to provide error-free movement of data between network nodes. To this end, the HDLC layer is designed to ensure the integrity of data passed to a next layer. In other words, the framing protocol seeks to reproduce the data received exactly as the data was originally transmitted, without errors, without loss of information, and in the correct order.

Figure 9:
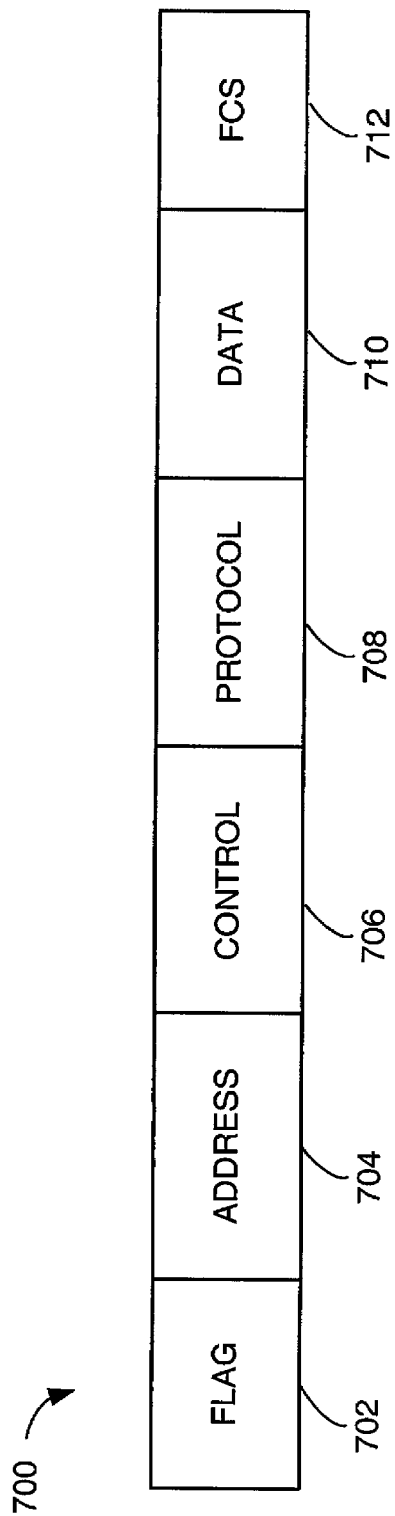
FIG. 9 is a header compression protocol.

The exemplary embodiment applies a version of HDLC framing that applies a subset of the HDLC defined parameters. FIG. 9 illustrates one embodiment of HDLS framing, wherein frame 700 includes a plurality of fields as defined by the HDLC protocol outlined in RFC 1662. Field 702 defines a FLAG or indication of a start of frame. The FLAG has a designated bit length and is defined by a predetermined pattern of bits. The HDLC is convenient to apply as the HDLC is a commonly available standardized protocol. One disadvantage of the full HDLC framing protocol is the processing time required to generate the frames at the transmitter and to retrieve the frames at the receiver.

In particular, the HDLC protocol is considered processor intensive as further processing is used to ensure the payload does not include the same sequence of bits as the FLAG. At the transmitter, if a FLAG sequence of bits is detected in the payload, an escape character is inserted into the payload to identify the FLAG as part of the payload and not indicating a start of frame. The process of adding an escape character is referred to as "escaping" hexadecimal patterns of 0x7E and 0x7D in the frame payload. An alternative method referred to as the Efficient Framing Protocol that is less processor intensive than the HDLC-like framing is described hereinbelow. FIG. 9 illustrates the options of using HDLC framing to transport PPP frame. For the HSBS operation, the HDLC-like framing overhead can be reduced by eliminating field that are not required, or have little meaning and/or provide little information, for a uni-directional broadcast. As described hereinabove, the FLAG is a predetermined sequence of bits indicating the beginning of an HDLC frame. The exemplary embodiment incorporates a FLAG or other start of frame indicator 802, as illustrated within the format 800 of FIG. 10. In contrast to the format of FIG. 9, the end of a frame is not indicated with overhead information in the exemplary embodiment. As the address and control fields of the format 700 have static values, these are not included in the format 800.

Figure 10:
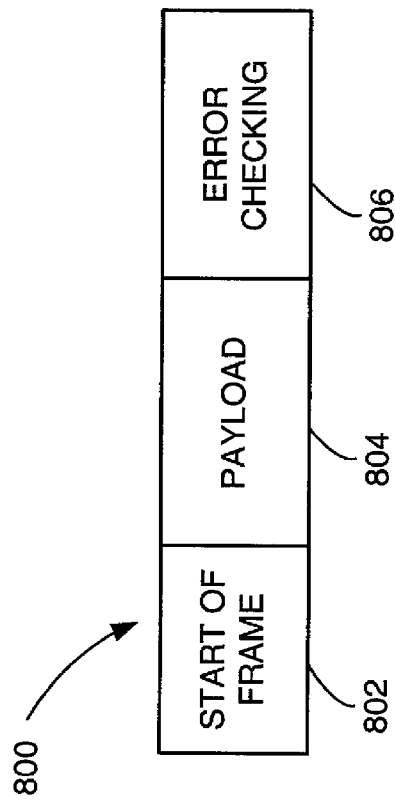
FIG. 10 is a header compression protocol for broadcast service in a wireless communication system.

Continuing with FIG. 10, as the purpose of the Protocol field 708 (FIG. 9) is to identify the payload type, such as LCP control packet, ROHC packet, IP packet, etc., this discriminator is not required for broadcast operation as all packets in the broadcast channel belong to the same type. For example, if ROHC compression is used for packet transmission, all packets in the broadcast channel are processed as ROHC packets. The types of ROHC packets, such as IR packet, compressed packet, etc., are distinguished by the Packet Type field in the ROHC packet header. Therefore, the Protocol field is not included in format 800. Further, the format 800 includes an error checking field 806 after the payload 804. The error checking field 806 provides information to the receiver to allow the receiver to check for errors in the received payload. The exemplary embodiment incorporates a Frame Check Sum (FCS) which may be specified as null, 16 bits, or 32 bits. Since an HDLC frame may span multiple physical-layer frames in the broadcast channel, it is recommended to use a 16-bit FCS.

The octet stuffing procedure defined in RFC 1662 is also applied to the exemplary embodiment, wherein after the FCS computation, the HDLC transmitter in the PDSN examines each byte in the HDLC frame (excluding the Flag) for the patterns of 0x7E and 0x7D. The pattern 0x7E will be encoded as 0x7D and 0x5E, and the pattern 0x7D will be encoded as 0x7D and 0x5D. The HDLC transmitter will not encode any other patterns. This implies that the Async-Control-Character-Map (ACCM) as defined in RFC 1662 is set to all zero.

The HDLC framing overhead is 3 bytes plus the octet stuffing overhead. Assuming the byte pattern is uniformly distributed, the average octet stuffing overhead is one byte per 128-byte of HDLC frame. For example, if the payload is 256 bytes, the HDLC framing overhead is 5 bytes on the average.

Figure 11:
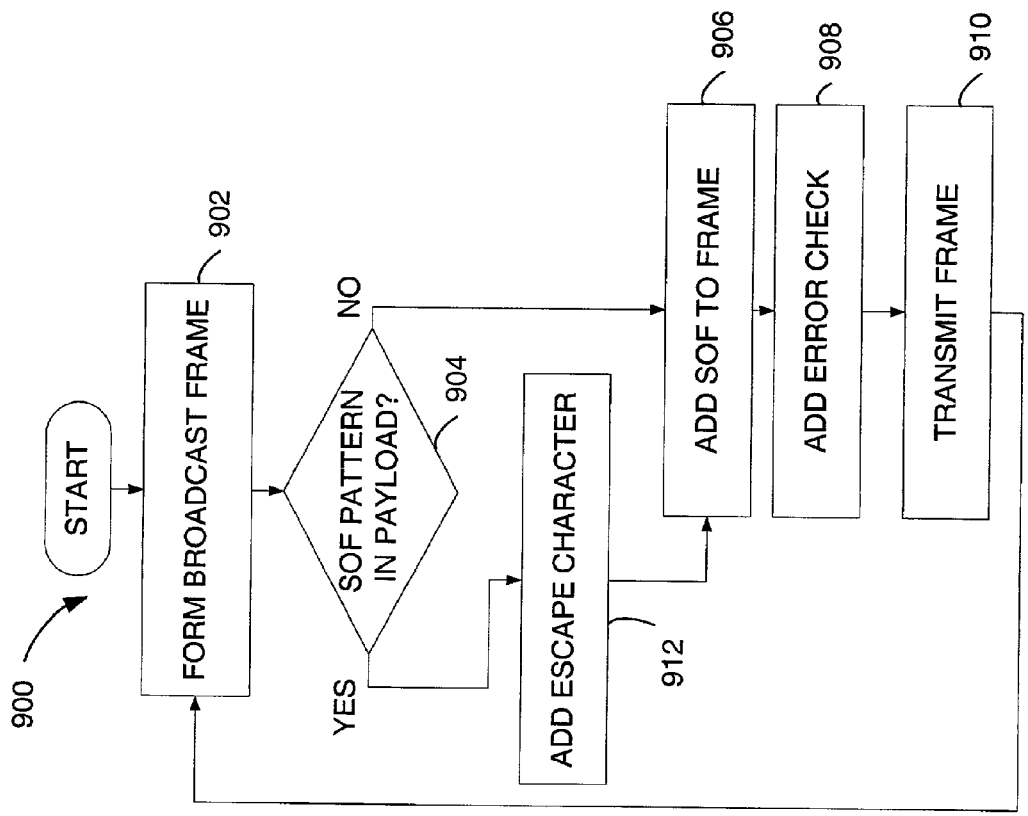
FIG. 11 is a flow chart of header compression for broadcast service in a wireless communication system.
Figure 13:
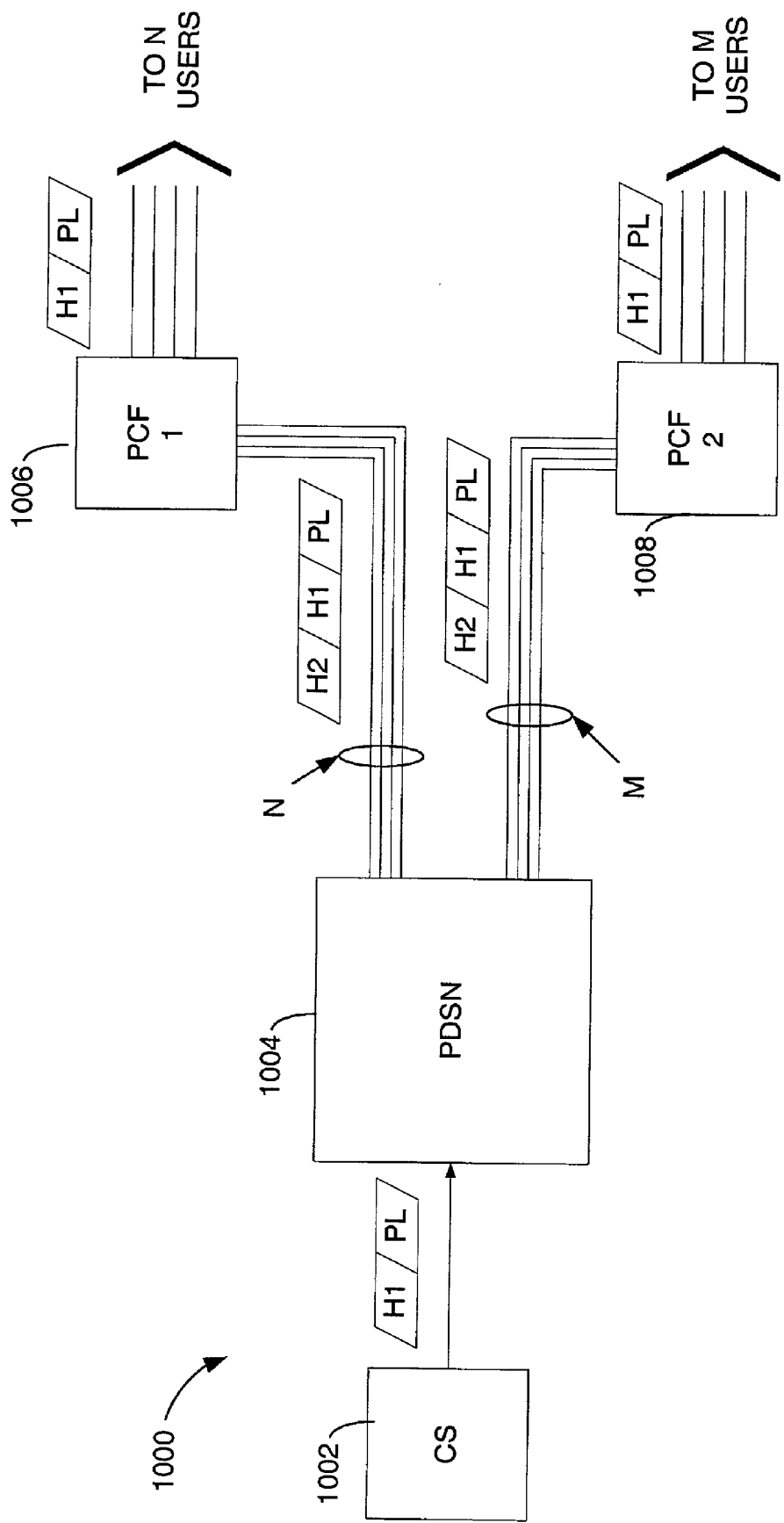
FIGS. 13 and 14 illustrate data transport in a wireless communication system.
Figure 14:
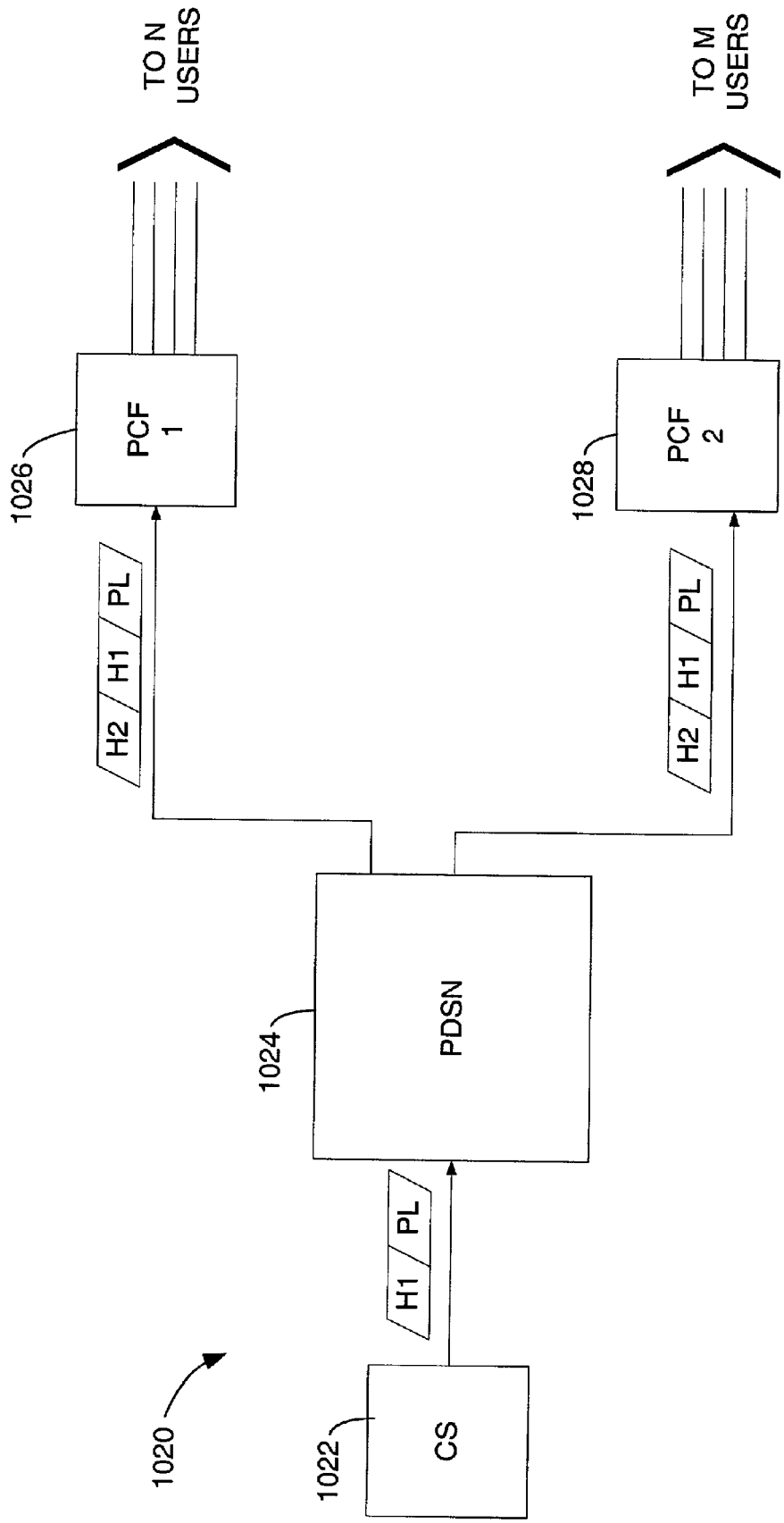

FIG. 11 is a flow diagram of a framing method 900 performed at the transmitter. The transmitter forms the broadcast frame at step 902 by determining a payload portion of the packetized data and generating a Start Of Flag (SOF). The transmitter then checks the frame for any SOF sequences contained in the payload 904. If an SOF sequence is found in the payload, the transmitter adds an escape character at step 912. Else, the transmitter appends the SOF to the payload at step 906 and provides an error checking mechanism at step 908. The frame is transmitted at step 910. The transmitted frame has the format 800 of FIG. 10. Alternate embodiments may implement other fields within the framing format and may incorporate any form of classifier to locate a SOF sequence in the payload.

Figure 12:
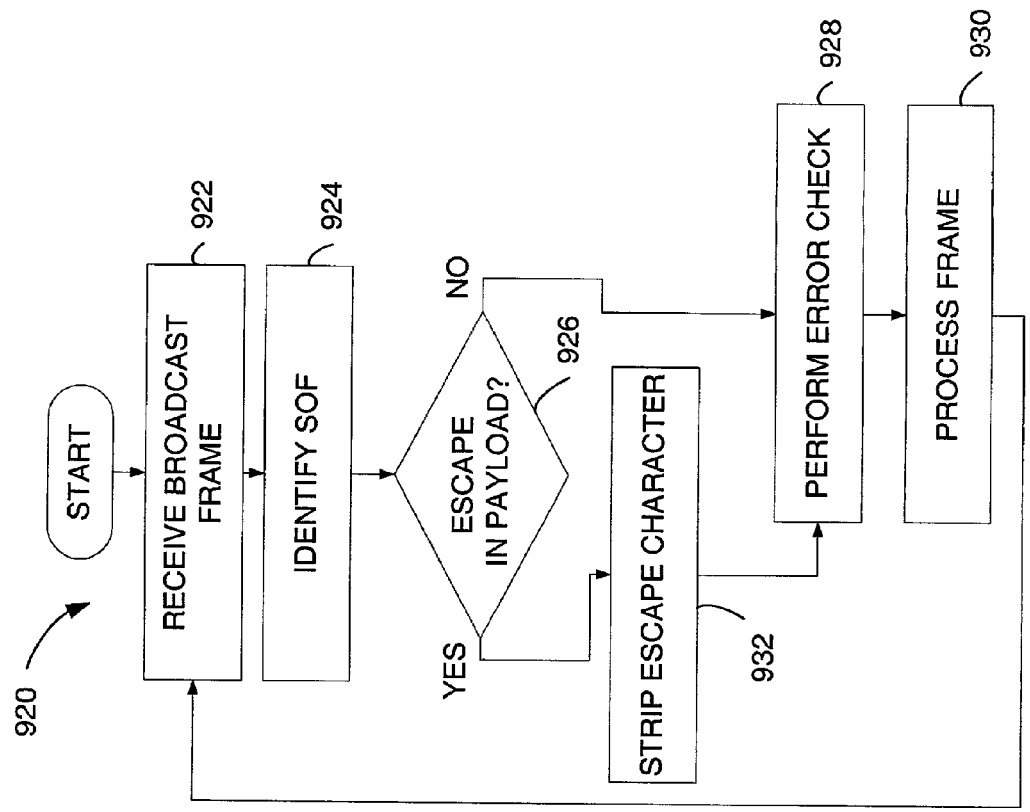
FIG. 12 is a flow diagram of header decompression for broadcast service in a wireless communication system.

FIG. 12 is a flow diagram of a de-framing method 920 performed at the receiver. The process starts on receipt of a broadcast frame at step 922. The receiver identifies a SOF at step 924, and checks for escape characters in the payload at decision diamond 926. If an escape character, or other SOF sequence identifier, is found in the payload, the receiver strips the escape character at step 932. Else, the receiver performs an error check at step 928 and processes the frame at step 930.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system supporting a broadcast service, a method comprising:
   transmitting a broadcast session on a broadcast transmission channel, wherein the broadcast transmission channel is a physical channel; and
   transmitting broadcast overhead information for the broadcast session in-band with the broadcast session on the broadcast transmission channel, wherein the broadcast overhead information includes a session description protocol (SDP) message that provides information including physical layer formatting information for decoding the physical channel carrying the broadcast session to a receiver for processing the received broadcast session on the received broadcast channel, and wherein the physical layer formatting information includes a Walsh code for decoding the physical channel.

2. The method as in claim 1, wherein the session description protocol message includes information for processing the broadcast session, and wherein the session description protocol message is interleaved with broadcast content of the broadcast session.

3. A method of transmitting a communication signal on a carrier wave, the method comprising:
transmitting a broadcast session portion; and
transmitting a session description protocol message (SDP message) for the broadcast session portion in-band with the broadcast session portion, wherein the SDP provides information including physical layer formatting information for decoding a physical channel carrying the broadcast session portion to a receiver for processing the received broadcast session portion, and wherein the physical layer formatting information includes a Walsh code for decoding the physical channel.

4. The method as in claim 3, wherein the signal is transmitted via a broadcast transmission channel, wherein the physical channel is the broadcast transmission channel.

5. In a wireless communication system supporting a broadcast service, a method comprising:
receiving a session description protocol (SDP) message for a broadcast session in-band corresponding to the broadcast session on a broadcast channel, wherein the broadcast channel is a physical channel, wherein the SDP message provides information including physical layer formatting information for decoding the physical channel carrying the broadcast session to a receiver for processing the received broadcast session on the received broadcast channel, and wherein the physical layer formatting information includes a Walsh code for decoding the physical channel;
accessing the broadcast session on the broadcast channel; and
processing the received broadcast session using the SDP message.

6. The method as in claim 5, wherein the SDP message is interleaved with broadcast content of the broadcast session.

7. A wireless apparatus, comprising:
means for receiving a broadcast service parameter message corresponding to a broadcast session on a broadcast transmission channel, wherein the broadcast transmission channel is a physical channel;
means for receiving an SDP message for a broadcast session in-band corresponding to the broadcast session in a broadcast stream, wherein the SDP message provides information including physical layer formatting information for decoding the physical channel carrying the broadcast session to a receiver for processing the received broadcast session on the received broadcast stream, and wherein the physical layer formatting information includes a Walsh code for decoding the physical channel; and
means for processing the received broadcast session using the SDP.

8. The apparatus as in claim 7, further comprising:
means for receiving header compression information.

9. The apparatus as in claim 7, further comprising:
memory storage to store the SDP corresponding to a plurality of broadcast sessions, wherein the SDP of each of the plurality of broadcast sessions is updated when the corresponding broadcast session is accessed.

10. The apparatus as in claim 9, wherein the memory storage is a cache memory.

11. The apparatus as in claim 9, wherein the memory storage is a look up table.

12. A method for indicating broadcast session protocol, comprising:
multiplexing information identifying a broadcast session protocol for a broadcast session in-band with a content of the broadcast session to provide a broadcast stream; and
transmitting the broadcast stream on a broadcast transmission channel, wherein the broadcast transmission channel is a physical channel, wherein the information identifying the broadcast session protocol includes a session description protocol (SDP) message that provides information including physical layer formatting information for decoding the physical channel carrying the broadcast session to a receiver for processing the received broadcast session on the received broadcast channel, and wherein the physical layer formatting information includes a Walsh code for decoding the physical channel.

13. The method as claimed in claim 12, wherein the multiplexing comprises:
multiplexing a content server.

14. The method as claimed in claim 12, wherein the multiplexing comprises:
multiplexing periodically.

15. The method as claimed in claim 14, wherein the multiplexing comprises:
multiplexing with a frequency of multiplexing a short-term encryption key.

16. The method as claimed in claim 12, wherein the multiplexing comprises:
multiplexing in accordance with a bandwidth condition.

17. The method as claimed in claim 16, wherein the multiplexing in accordance with the bandwidth condition comprises:
multiplexing when a broadcast content bandwidth is low.

18. The method as claimed in claim 12, wherein the multiplexing comprises:
multiplexing a broadcast session description identifier with the content of the broadcast session to provide the broadcast stream.

19. A method indicating broadcast session protocol, comprising:
receiving a broadcast stream;
determining information for a broadcast session received in-band with the broadcast stream, the information includes a session description protocol (SDP) message including physical layer formatting information for decoding a physical channel carrying the broadcast session in the broadcast stream, wherein the physical layer formatting information includes a broadcast session protocol in accordance with the received broadcast stream, and wherein the physical layer formatting information includes a Walsh code for decoding the physical channel; and
processing the received broadcast session on the received broadcast stream in accordance with the determined information if a receiving station contains the broadcast session protocol.

20. The method as claimed in claim 19, wherein the processing comprises:
retrieving the broadcast session protocol from a storage media at the receiving station; and
processing the broadcast stream in accordance with the retrieved broadcast session protocol.

21. The method as claimed in claim 19, further comprising:
retrieving the broadcast session protocol from a content server if the receiving station does not contain the broadcast session protocol; and
processing the broadcast stream in accordance with the retrieved broadcast session protocol.

22. The method as claimed in claim 19, wherein the determining comprises:
determining a broadcast session description identifier of the broadcast session.

23. A method for indicating broadcast session protocol, comprising:
multiplexing information identifying a broadcast session protocol for a broadcast session in-band with a content of the broadcast session to provide a broadcast stream; and
providing the broadcast stream for transmission, wherein the information identifying the broadcast session protocol includes a session description protocol (SDP) message that provides information including physical layer formatting information for decoding a physical channel carrying the broadcast session to a receiver for processing the received broadcast session on the received broadcast stream, and wherein the physical layer formatting information includes a Walsh code for decoding the physical channel.

24. The method as claimed in claim 23, wherein the multiplexing comprises:
multiplexing at a content server.

25. The method as claimed in claim 23, wherein the multiplexing comprises:
multiplexing periodically.

26. The method as claimed in claim 25, wherein the multiplexing comprises:
multiplexing with a frequency of multiplexing a short-term encryption key.

27. The method as claimed in claim 23, wherein the multiplexing comprises:
multiplexing in accordance with a bandwidth condition.

28. The method as claimed in claim 27, wherein the multiplexing in accordance with the bandwidth condition comprises:
multiplexing when a broadcast content bandwidth is low.

29. The method as claimed in claim 23, wherein the multiplexing comprises:
multiplexing a broadcast session description identifier with the content of the broadcast session to provide the broadcast stream.

30. The method as claimed in claim 29, wherein multiplexing the broadcast session description identifier with the content of the broadcast session to provide the broadcast stream comprises:
forming an information element comprising the broadcast session description identifier; and
multiplexing the information element with the content of the broadcast session to provide the broadcast stream.

31. The method as claimed in claim 23, wherein the providing the broadcast stream for transmission comprises:
assigning each unit of the broadcast stream a sequence number.

32. The method as claimed in claim 31, further comprising:
delivering each of the units through a media not guaranteeing in-sequence delivery; and
re-ordering the delivered units in accordance with the sequence numbers.

33. The method as claimed in claim 23, wherein the providing the broadcast stream for transmission comprises:
establishing a generic routing encapsulation tunnel through a media not guaranteeing in-sequence delivery.

34. A method for indicating a broadcast session protocol, comprising:
receiving a broadcast stream;
determining information element for a broadcast session is received in-band with the received broadcast stream, the information element includes a session description protocol (SDP) message including physical layer formatting information for decoding a physical channel carrying the broadcast session in the received broadcast stream for the received broadcast session, and wherein the physical layer formatting information includes a Walsh code for decoding the physical channel; and
processing the received broadcast stream in accordance with the determined information element.

35. The method as claimed in claim 34, wherein the determining the information element comprises determining a broadcast session protocol, and wherein the processing the broadcast stream in accordance with the determined information element comprises processing the broadcast stream in accordance with the broadcast session protocol.

36. The method as claimed in claim 34, wherein the determining the information element comprises determining a broadcast session description identifier, and wherein the processing the broadcast stream in accordance with the determined information element comprises:
processing the broadcast stream in accordance with a broadcast session protocol corresponding to the broadcast session description identifier.

37. The method as claimed in claim 36, wherein the processing the broadcast stream in accordance with the broadcast session protocol further comprises:
requesting the broadcast session protocol from a content server if a receiving station does not contain the broadcast session protocol.

38. The method as claimed in claim 37, further comprising:
retrieving the broadcast session protocol from a storage media at the receiving station if the receiving station contains the broadcast session protocol.

39. A method for indicating broadcast session protocol, comprising:
multiplexing information for a broadcast session in-band with a broadcast stream, the information including a session description protocol (SDP) message including physical layer formatting information for decoding a physical channel carrying the broadcast session for a receiver for processing a broadcast transmission channel with a content of the broadcast session to produce the broadcast stream; and
transmitting the broadcast stream on the broadcast transmission channel, wherein the physical channel is the broadcast transmission channel, and wherein the physical layer formatting information includes a Walsh code for decoding the physical channel.

40. The method as claimed in claim 39, wherein the multiplexing comprises:
multiplexing a broadcast session protocol with the content of the broadcast session before a broadcast session protocol change; and multiplexing information identifying the broadcast session protocol with the content of the broadcast session after the broadcast session protocol change.

41. The method as claimed in claim 39, wherein the multiplexing comprises:

multiplexing at a content server.

42. The method as claimed in claim 39, wherein the multiplexing comprises:

multiplexing periodically.

43. The method as claimed in claim 42, wherein the multiplexing comprises:

multiplexing with a frequency of multiplexing a short-term encryption key.

44. The method as claimed in claim 39, wherein the multiplexing comprises:

multiplexing in accordance with a bandwidth condition.

45. The method as claimed in claim 44, wherein the multiplexing in accordance with the bandwidth condition comprises:

multiplexing when a broadcast content bandwidth is low.

46. The method as claimed in claim 39, wherein the multiplexing comprises:

multiplexing a broadcast session description identifier with the content of the broadcast session.

47. A method indicating broadcast protocol options, comprising:

receiving a broadcast stream;

determining information for a broadcast session received in-band with the broadcast stream, the information including a session description protocol (SDP) message including physical layer formatting information for decoding a physical channel carrying the broadcast session to a receiver in the broadcast stream for processing the received broadcast session, and wherein the physical layer formatting information includes a Walsh code for decoding the physical channel; and processing the received broadcast stream in accordance with the determined information for the received broadcast session.

48. The method as claimed in claim 47, wherein the processing comprises:

processing if the determined information comprises the broadcast session protocol.

49. The method as claimed in claim 47, wherein the processing comprises:

processing if the determined information comprises a broadcast session description identifier and a receiving station contains a broadcast session protocol.

50. The method as claimed in claim 49, wherein the processing the broadcast session in accordance with the determined information if the receiving station contains the broadcast session protocol comprises:

retrieving the broadcast session protocol from a storage media at the receiving station; and processing the broadcast session in accordance with the retrieved broadcast session protocol.

51. The method as claimed in claim 49, further comprising:

retrieving the broadcast session protocol from a content server if the determined information comprises the broadcast session description identifier and the receiving station does not contain the broadcast session protocol; and processing the broadcast session in accordance with the retrieved information.

\* \* \* \* \*